US006569354B2

(12) United States Patent
Hage

(10) Patent No.: US 6,569,354 B2
(45) **Date of Patent: *May 27, 2003**

(54) COMPOSITION AND METHOD FOR BLEACHING A SUBSTRATE

(75) Inventor: Ronald Hage, Vlaadingen (NL)

(73) Assignee: Unilever Home & Personal Care USA, division of Conopco, Inc., Greenwich, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/740,114

(22) Filed: Dec. 19, 2000

(65) Prior Publication Data

US 2001/0012825 A1 Aug. 9, 2001

(30) Foreign Application Priority Data

Dec. 24, 1999 (GB) ............................................ 9930695

(51) Int. Cl.$^7$ ............................................... C01G 45/00

(52) U.S. Cl. .................. 252/186.33; 510/492; 510/499; 510/500; 502/162; 502/165; 502/167; 502/200; 502/202; 8/107; 8/111; 8/137

(58) Field of Search ................................ 510/311, 376, 510/492, 499, 500; 8/111, 107, 137; 252/186.33; 502/162, 200, 222, 165, 167

(56) References Cited

U.S. PATENT DOCUMENTS 6,302,921 B1 * 10/2001 Delroisse et al. ............... 8/111

FOREIGN PATENT DOCUMENTS

| | | |
|---|---|---|
| WO | 98/39098 | 9/1998 |
| WO | 98/39406 | 9/1998 |
| WO | 99/65905 | 12/1999 |
| WO | 00/29537 | 5/2000 |
| WO | 00/52124 | 9/2000 |
| WO | 00/60044 | 10/2000 |

* cited by examiner

*Primary Examiner*—Gregory Delcotto
(74) *Attorney, Agent, or Firm*—Milton L. Honig

(57) ABSTRACT

The invention relates to catalytically bleaching substrates, especially laundry fabrics, with atmospheric oxygen or air. A method of bleaching a substrate is provided that comprises applying to the substrate, in an aqueous medium, a specified organic substance which forms a complex with a transition metal, the complex catalysing bleaching of the substrate by atmospheric oxygen. Also provided is a bleaching composition comprising, in an aqueous medium, atmospheric oxygen and an organic substance which forms a complex with a transition metal, the complex catalysing bleaching of the substrate by the atmospheric oxygen, wherein the aqueous medium is substantially devoid of peroxygen bleach or a peroxy-based or -generating bleach system.

24 Claims, No Drawings

COMPOSITION AND METHOD FOR BLEACHING A SUBSTRATE

This invention relates to compositions and methods for catalytically bleaching substrates with atmospheric oxygen or air.

Peroxygen bleaches are well known for their ability to remove stains from substrates. Traditionally, the substrate is subjected to hydrogen peroxide, or to substances which can generate hydroperoxyl radicals, such as inorganic or organic peroxides. Generally, these systems must be activated. One method of activation is to employ wash temperatures of 60° C. or higher. However, these high temperatures often lead to inefficient cleaning, and can also cause premature damage to the substrate.

A preferred approach to generating hydroperoxyl bleach radicals is the use of inorganic peroxides coupled with organic precursor compounds. These systems are employed for many commercial laundry powders. For example, various European systems are based on tetraacetyl ethylenediamine (TAED) as the organic precursor coupled with sodium perborate or sodium percarbonate, whereas in the United States laundry bleach products are typically based on sodium nonanoyloxybenzenesulphonate (SNOBS) as the organic precursor coupled with sodium perborate.

Precursor systems are generally effective but still exhibit several disadvantages. For example, organic precursors are moderately sophisticated molecules requiring multi-step manufacturing processes resulting in high capital costs. Also, precursor systems have large formulation space requirements so that a significant proportion of a laundry powder must be devoted to the bleach components, leaving less room for other active ingredients and complicating the development of concentrated powders. Moreover, precursor systems do not bleach very efficiently in countries where consumers have wash habits entailing low dosage, short wash times, cold temperatures and low wash liquor to substrate ratios.

Alternatively, or additionally, hydrogen peroxide and peroxy systems can be activated by bleach catalysts, such as by complexes of iron and the ligand N4Py (i.e. N, N-bis (pyridin-2-yl-methyl)-bis(pyridin-2-yl)methylamine) disclosed in WO95/34628, or the ligand Tpen (i.e. N,N,N',N'-tetra(pyridin-2-yl-methyl)ethylenediamine) disclosed in WO97/48787. According to these publications, molecular oxygen may be used as the oxidant as an alternative to peroxide generating systems. However, no role in catalysing bleaching by atmospheric oxygen or air in an aqueous medium is reported.

WO-A-98/39098 and WO-A-98/39406 disclose classes of complexes of a transition metal coordinated to a macropolycyclic ligand, used as oxidation catalysts in laundry or cleaning compositions. The compositions preferably comprise an oxygen bleaching agent, as part or all of the laundry or cleaning adjunct materials, which can be any of the oxidizing agents known for laundry, hard surface cleaning, automatic dishwashing or denture cleaning purposes. Oxygen bleaches are preferred, though other oxidant bleaches such as oxygen may be used. Again, however, no role in catalysing bleaching by atmospheric oxygen or air in an aqueous medium is reported.

It has long been thought desirable to be able to use atmospheric oxygen (air) as the source for a bleaching species, as this would avoid the need for costly hydroperoxyl generating systems. Unfortunately, air as such is kinetically inert towards bleaching substrates and exhibits no bleaching ability. Recently some progress has been made in this area. For example, WO 97/38074 reports the use of air for oxidising stains on fabrics by bubbling air through an aqueous solution containing an aldehyde and a radical initiator. A broad range of aliphatic, aromatic and heterocyclic aldehydes is reported to be useful, particularly para-substituted aldehydes such as 4-methyl-, 4-ethyl- and 4-isopropyl benzaldehyde, whereas the range of initiators disclosed includes N-hydroxysuccinimide, various peroxides and transition metal coordination complexes.

However, although this system employs molecular oxygen from the air, the aldehyde component and radical initiators such as peroxides are consumed during the bleaching process. These components must therefore be included in the composition in relatively high amounts so as not to become depleted before completion of the bleaching process in the wash cycle. Moreover, the spent components represent a waste of resources as they can no longer participate in the bleaching process.

Accordingly, it would be desirable to be able to provide a bleaching system based on atmospheric oxygen or air that does not rely primarily on hydrogen peroxide or a hydroperoxyl generating system, and that does not require the presence of organic components such as aldehydes that are consumed in the process. Moreover, it would be desirable to provide such a bleaching system that is effective in aqueous medium.

We have now found, surprisingly, that classes of complexes of the type disclosed in WO-A-98/39098 and WO-A-98/39406 can be used in an aqueous medium with atmospheric oxygen or air to bleach substrates, even in the absence of a conventional oxygen bleaching agent.

Accordingly, in a first aspect, the present invention provides a bleaching composition comprising, in an aqueous medium, atmospheric oxygen and an organic substance which forms a complex with a transition metal, the complex catalysing bleaching of a substrate by the atmospheric oxygen, wherein the aqueous medium is substantially devoid of peroxygen bleach or a peroxy-based or -generating bleach system, wherein the organic substance forms a complex of a transition metal, preferably selected from Mn(II), Mn(III), Mn(IV), Mn(V), Fe(II), Fe(III), Fe(IV), Co(I), Co(II), Co(III), Ni(I), Ni(II), Ni(III), Cu(I), CU(II), Cu(III), Cr(II), Cr(III), Cr(IV), Cr(V), Cr(VI), V(III), V(IV), V(V) Mo(IV), Mo(V), Mo(VI), W(IV), W(V), W(VI), Pd(II), Ru(II), Ru(III) and Ru(IV), coordinated with a macropolycyclic rigid ligand having at least 3 donor atoms, at least two of which are bridgehead donor atoms. The medium is therefore preferably insensitive or stable to catalase, which acts on peroxy species.

In a second aspect, the present invention provides a method of bleaching a substrate comprising applying to the substrate, in an aqueous medium, an organic substance which forms a complex with a transition metal, the complex catalysing bleaching of the substrate by atmospheric oxygen, as further specified in the claim 24.

Furthermore, in a third aspect, the present invention provides the use of an organic substance which forms a complex with a transition metal, as a catalytic bleaching agent for a substrate in an aqueous medium substantially devoid of peroxygen bleach or a peroxy-based or -generating bleach system, the complex catalysing bleaching of the substrate by the atmospheric oxygen.

Advantageously, the method according to the present invention permits all or the majority of the bleaching species in the medium (on an equivalent weight basis) to be derived from atmospheric oxygen. Thus, the medium can be made wholly or substantially devoid of peroxygen bleach or a peroxy-based or -generating bleach system. Furthermore, the organic substance is a catalyst for the bleaching process and, as such, is not consumed but can continue to participate in the bleaching process. The catalytically activated bleaching system of the type in accordance with the present invention, which is based on atmospheric oxygen, is therefore both cost-effective and environmentally friendly.

Moreover, the bleaching system is operable under unfavourable wash conditions which include low temperatures, short contact times and low dosage requirements.

Furthermore, the method is effective in an aqueous medium and is therefore particularly applicable to bleaching of laundry fabrics. Therefore, whilst the composition and method according to the present invention may be used for bleaching any suitable substrate, the preferred substrate is a laundry fabric.

The bleaching method may be carried out by simply leaving the substrate in contact with the medium for a sufficient period of time. Preferably, however, the aqueous medium on or containing the substrate is agitated.

It has also been found that after bleaching if the treated substrate is dried by a tumble drier, ironing process or any other heat-generating process wherein the temperature of the process is between 35° C. and 80° C. the bleaching effect is accelerated in comparison to drying at ambient temperatures.

The organic substance may comprise a preformed complex of a ligand and a transition metal. Alternatively, the organic substance may comprise a free ligand that complexes with a transition metal already present in the water or that complexes with a transition metal present in the substrate. The organic substance may also be included in the form of a composition of a free ligand or a transition metal-substitutable metal-ligand complex, and a source of transition metal, whereby the complex is formed in situ in the medium.

The organic substance forms a complex with one or more transition metals, in the latter case for example as a dinuclear complex. Suitable transition metals include for example: manganese in oxidation states II–V, iron I–IV, copper I–III, cobalt I–III, nickel I–III, chromium II–VII, silver I–II, titanium II–IV, tungsten IV–VI, palladium II, ruthenium II–V, vanadium II–V and molybdenum II–VI.

In a preferred embodiment, the organic substance forms a complex of the general formula:

$$[M_aL_kX_n]Y_m$$

in which:

M represents a metal selected from Mn(II)-(III)-(IV)-(V), Cu(I)-(II)-(III), Fe(I)-(II)-(III)-(IV), Co(I)-(II)-(III), Ni(I)-(II)-(III), Cr(II)-(III)-(IV)-(V)-(VI)-(VII), Ti(II)-(III)-(IV), V(II)-(III)-(IV)-(V), Mo(II)-(III)-(IV)-(V)-(VI), W(IV)-(V)-(VI), Pd(II), Ru(II)-(III)-(IV)-(V) and Ag(I)-(II), and preferably selected from Mn(II)-(III)-(IV)-(V), Cu(I)-(II), Fe(II)-(III)-(IV) and Co(I)-(II)-(III);

L represents a macropolycyclic rigid ligand as herein defined, or its protonated or deprotonated analogue;

X represents a coordinating species selected from any mono, bi or tri charged anions and any neutral molecules able to coordinate the metal in a mono, bi or tridentate manner, preferably selected from $O^{2-}$, $RBO_2^{2-}$, $RCOO^-$, $RCONR^-$, $OH^-$, $NO_3^-$, $NO_2^-$, NO, CO, $S^{2-}$, $RS^-$, $PO_4^{4-}$, STP-derived anions, $PO_3OR^{3-}$, $H_2O$, $CO_3^{2-}$, $HCO_3^-$, ROH, NRR'R'', RCN, $Cl^-$, $Br^-$, $OCN^-$, $SCN^-$, $CN^-$, $N_3^-$, $F^-$, $I^-$, $RO^-$, $ClO_4^-$, $SO_4^{2-}$, $HSO_4^-$, $SO_3^{2-}$ and $RSO_3^-$, and more preferably selected from $O^{2-}$, $RBO_2^{2-}$, $RCOO^-$, $OH^-$, $NO_3^-$, $NO_2^-$, NO, CO, $CN^-$, $S^{2-}$, $RS^-$, $PO_3^{4-}$, $H_2O$, $CO_3^{2-}$, $HCO_3^-$, ROH, NRR'R'', $Cl^-$, $Br^-$, $OCN^-$, $SCN^-$, RCN, $N_3^-$, $F^-$, $I^-$, $RO^-$, $ClO_4^-$, $SO_4^{2-}$, $HSO_4^-$, $SO_3^{2-}$ and $RSO_3^-$ (preferably $CF_3SO_3^-$);

Y represents any non-coordinated counter ion, preferably selected from $ClO_4^-$, $BR_4^+$, $[FeCl_4]^-$, $PF_6^-$, $RCOO^-$, $NO_3^-$, $NO_2^-$, $RO^-$, $N^+RR'R''R'''$, $Cl^-$, $Br^-$, $F^-$, $I^-$, $RSO_3^-$, $S_2O_6^{2-}$, $OCN^-$, $SCN^-$, $Li^+$, $Ba^{2-}$, $Na^+$, $Mg^{2+}$, $K^+$, $Ca^{2+}$, $Cs^+$, $PR_4^+$, $RBO_2^{2-}$, $SO_4^{2-}$, $HSO_4^-$, $SO_3^{2-}$, $SbCl_6^-$, $CuCl_4^{2-}$, CN, $PO_4^{3-}$, $HPO_4^{2-}$, $H_2PO_4^-$, STP-derived anions, $CO_3^{2-}$, $HCO_3^-$ and $BF_4^-$, and more preferably selected from $ClO_4^-$, $BR_4^-$, $[FeCl_4]^-$, $PF_6^-$, $RCOO^-$, $NO_3^-$, $NO_2^-$, $RO^-$, $N^+RR'R''R'''$, $Cl^-$, $Br^-$, $F^-$, $I^-$, $RSO_3^-$ (preferably $CF_3SO_3^-$) $S_2O_6^{2-}$, $OCN^-$, $SCN^-$, $Li^+$, $Ba^{2+}$, $Na^+$, $Mg^{2+}$, $K^+$, $Ca^{2+}$, $PR_4^+$, $SO_4^{2-}$, $HSO_4^-$, $SO_3^{2-}$, and $BF_4^-$;

R, R', R'', R''' independently represent a group selected from hydrogen, hydroxyl, —OR (wherein R=alkyl, alkenyl, cycloalkyl, heterocycloalkyl, aryl, heteroaryl or carbonyl derivative group), —OAr, alkyl, alkenyl, cycloalkyl, heterocycloalkyl, aryl, heteroaryl and carbonyl derivative groups, each of R, Ar, alkyl, alkenyl, cycloalkyl, heterocycloalkyl, aryl, heteroaryl and carbonyl derivative groups being optionally substituted by one or more functional groups E, or R6 together with R7 and independently R8 together with R9 represent oxygen, wherein E is selected from functional groups containing oxygen, sulphur, phosphorus, nitrogen, selenium, halogens, and any electron donating and/or withdrawing groups, and preferably R, R', R'', R''' represent hydrogen, optionally substituted alkyl or optionally substituted aryl, more preferably hydrogen or optionally substituted phenyl, naphthyl or $C_{1-4}$-alkyl;

a represents an integer from 1 to 10, preferably from 1 to 4;

k represents an integer from 1 to 10;

n represents zero or an integer from 1 to 10, preferably from 1 to 4;

m represents zero or an integer from 1 to 20, preferably from 1 to 8.

In a preferred embodiment, the present invention relates to a method for oxidizing materials, said method comprising contacting a material capable of being oxidized and a transition-metal oxidation catalyst, in an aqueous medium essentially devoid of any oxidation agent, wherein said transition metal oxidation catalyst comprises a complex of a transition metal selected from the group consisting of Mn(II), Mn(III), Mn(IV), Mn(V), Fe(II), Fe(III), Fe(IV), Co(I), Co(II), Co(III), Ni(I), Ni(II), Ni(III), Cu(I), Cu(II), Cu(III), Cr(II), Cr(III), Cr(IV), Cr(V), Cr(VI), V(III), V(IV), V(V), Mo(IV), Mo(V), Mo(VI), W(IV), W(V), W(VI), Pd(II), Ru(II), Ru(III), and Ru(IV), preferably Mn(II, Mn(III), Mn(IV), Fe(II), Fe(III), Fe(IV), Cu(I), Cu(II), Cu(III), Co(I), Co(II), Co(III), more preferably Mn(II), Mn(III), Fe(II), Fe(III), Cu(I), Cu(II), Co(II), Co(III) coordinated with a macropolycyclic rigid ligand, preferably a cross-bridged macropolycyclic ligand, having at least 3 donor atoms, at least two of which are bridgehead donor atoms.

The present invention also relates to catalytic systems effective for oxidation of materials comprising: (a) a catalytically effective amount, preferably from about 1 ppb to about 99.9%, more typically from about 0.001 ppm to about 500 ppm, more preferably from about 0.05 ppm to about 100 ppm (wherein "ppb" denotes parts per billion by weight and "ppm" denotes parts per million by weight), of a transition-metal oxidation catalyst, wherein said transition-metal oxidation catalyst comprises a complex of a transition metal selected from the group consisting of Mn(II), Mn(III), Mn(IV), Mn(V), Fe(II), Fe(III), Fe(IV), Co(I), Co(II), Co(III), Ni(I), Ni(II), Ni(III), Cu(I), Cu(II), Cu(I11), Cr(II), Cr(III), Cr(IV), Cr(V), Cr(VI), V(III), V(IV), V(V), Mo(IV), Mo(V), Mo(VI), W(IV), W(V), W(VI), Pd(II), Ru(II), Ru(III), and Ru(IV) coordinated with a macropolycyclic rigid ligand, preferably a cross-bridged macropolycyclic ligand, having at least 3 donor atoms, at least two of which are bridgehead donor atoms; and (b) the balance, to 100%, of one or more adjunct materials.

Amounts of the essential transition-metal catalyst and essential adjunct materials can vary widely depending on the precise application. For example, the catalytic systems herein may be provided as a concentrate, in which case the catalyst can be present in a high proportion, for example 0.01%–80%, or more, of the composition. The invention also encompasses catalytic systems at their in-use levels; such systems include those in which the catalyst is dilute, for example at ppb levels. Intermediate level compositions, for example those comprising from about 0.01 ppm to about 500 ppm, more preferably from about 0.05 ppm to about 50 ppm, more preferably still from about 0.1 ppm to about 10 ppm of transition-metal catalyst and the balance to 100%, preferably at least about 0.1%, typically about 99% or more being solid-form or liquid-form adjunct materials (for example fillers, solvents, and adjuncts especially adapted to a particular use (for example paper making adjuncts, detergent adjuncts, or the like).

The present invention preferably relates to catalytic systems effective for oxidation of materials comprising: (a) a catalytically effective amount, preferably from about 1 ppb to about 49%, of a transition-metal oxidation catalyst, said catalyst comprising a complex of a transition metal and a macropolycyclic rigid ligand, preferably a cross-bridged macropolycyclic ligand, wherein: (1) said transition metal is selected from the group consisting of Mn(II), Mn(III), Mn(IV), Mn(V), Fe(II), Fe(III), Fe(IV), Co(I), Co(II), Co(III), Ni(I), Ni(II), Ni(III), Cu(I), Cu(II), Cu(III), Cr(II), Cr(III), Cr(IV), Cr(V), Cr(VI), V(III), V(IV), V(V), Mo(IV), Mo(V), Mo(VI), W(IV), W(V), W(VI), Pd(II), Ru(II), Ru(III), and Ru(IV); (2) said macropolycyclic rigid ligand is coordinated by at least three, preferably at least four, more preferably four or five donor atoms to the same transition metal and comprises:

(i) an organic macrocycle ring containing three, preferably four, or more donor atoms (preferably at least 3, more preferably at least 4, of these donor atoms are N) separated from each other by covalent linkages of at least one, preferably 2 or 3 non-donor atoms, two to five (preferably three or four, more preferably four) of these donor atoms being coordinated to the same transition metal in the complex.

(ii) a linking moiety, preferably a cross-bridging chain, which covalently connects at least 2 (preferably non-adjacent) donor atoms of the organic macrocycle ring, said covalently connected (preferably non-adjacent) donor atoms being bridgehead donor atoms which are coordinated to the same transition metal in the complex, and wherein said linking moiety (preferably a cross-bridged chain) comprises from 2 to about 10 atoms (preferably the cross-bridged chain is selected from 2, 3 or 4 non-donor atoms, and 4–6 non-donor atoms with a further donor atom), including for example, a cross-bridge which is the result of a Mannich condensation of ammonia and formaldehyde; and (iii) optionally, one or more non-macropolycyclic ligands, preferably monodentate ligands, such as those selected from the group consisting of $H_2O$, ROH, $NR_3$, RCN, $OH^-$, $OOH^-$, $RS^-$, $RO^-$, $RCOO^-$, $OCN^-$, $SCN^-$, $N_3^-$, $CN^-$, $F^-$, $C1^-$, $Br^-$, $I^-$, $O_2^-$, $NO_3^-$, $NO_2^-$, $SO_4^{2-}$, $SO_3^{2-}$, $PO_4^{3-}$, organic phosphates, organic phosphonates, organic sulphates, organic sultanates, and aromatic N donors such as pyridines, pyrazines, pyrazoles, imidazoles, benzimidazoles, pyrimidines, triazoles and thiazoles with R being H, optionally substituted alkyl, optionally substituted aryl (specific examples of monodentate ligands including phenolate, acetate or the like); and (b) at least about 0.1%, preferably B%, of one or more adjunct materials (where B%, the "balance" of the composition expressed as a percentage, is obtained by subtracting the weight of said component (a) from the weight of the total composition and then expressing the result as a percentage by weight of the total composition).

The present invention also preferably relates to catalytic systems effective for oxidation of materials comprising: (a) a catalytically effective amount, as identified supra, of a transition-metal oxidation catalyst, said catalyst comprising a complex of a transition metal and a macropolycyclic rigid ligand (preferably a cross-bridged macropolycyclic ligand) wherein: (I) said transition metal is selected from the group consisting of Mn(II), Mn(III), Mn(IV), Mn(V), Fe(II), Fe(III), Fe(IV), Co(I), Co(II), Co(III), Ni(I), Ni(II), Ni(III), Cu(I), Cu(II), Cu(III), Cr(II), Cr(III), Cr(IV). Cr(V), Cr(VI), V(III), V(IV), V(V) Mo(IV), Mo(V), Mo(VI), W(IV), W(V), W(VI), Pd(II), Ru(II), Ru(III), and Ru(IV), and (2) said macropolycyclic rigid ligand is selected from the group consisting of: (i) the macropolycyclic rigid ligand of formula (I) having denticity of 3 or 4:

(I)

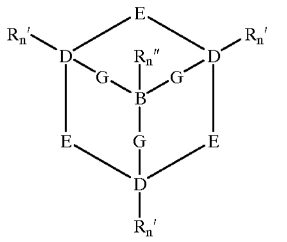

(ii) the macropolycyclic rigid ligand of formula (II) having denticity of 4 or 5

(II)

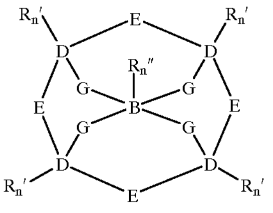

(iii) the macropolycyclic rigid ligand of formula (III) having denticity of 5 or 6:

(III)

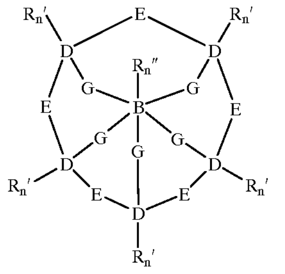

(iv) the macropolycyclic rigid ligand of formula (IV) having denticity of 6 or 7

(IV)

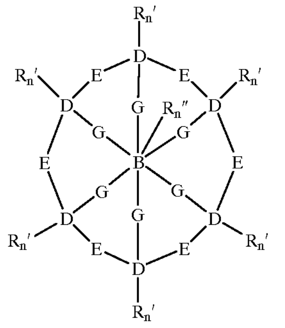

wherein in these formulas:

each "E" is the moiety $(CR_n)_a$—X—$(CR_n)_{a'}$, wherein X is selected from the group consisting of O, S, NR and P, or a covalent bond, and preferably X is a covalent bond and for each E the sum of a+a' is independently selected from 1 to 5, more preferably 2 and 3.

each "G" is the moiety $(CR_n)_b$.

each "R" is independently selected from H, alkyl, alkenyl, alkynyl, aryl, alkylaryl (e.g., benzyl), and heteroaryl, or two or more R are covalently bonded to form an aromatic, heteroaromatic, cycloalkyl, or heterocycloalkyl ring.

each "D" is a donor atom independently selected from the group consisting of N, O, S, and P, and at least two D atoms are bridgehead donor atoms coordinated to the transition metal (in the preferred embodiments, all donor atoms designated D are donor atoms which coordinate to the transition metal, in contrast with heteroatoms in the structure which are not in D such as those which may be present in E; the non-D heteroatoms can be non-coordinating and indeed are non-coordinating whenever present in the preferred embodiment).

"B" is a carbon atom or "D" donor atom, or a cycloalkyl or heterocyclic ring.

each "n" is an integer independently selected from 1 and 2, completing the valence of the carbon atoms to which the R moieties are covalently bonded.

each "n'" is an integer independently selected from 0 and 1, completing the valence of the D donor atoms to which the R moieties are covalently bonded.

each "n"" is an integer independently selected from 0, 1, and 2 completing the valence of the B atoms to which the R moieties are covalently bonded.

each "a" and "a'" is an integer independently selected from 0–5, preferably a+a' equals 2 or 3, wherein the sum of all "a" plus "a'" in the ligand of formula (I) is within the range of from about 7 to about 11. The sum of all "a" plus "a" in the ligand of formula (II) is within the range of from about 6 (preferably 8) to about 12. The sum of all "a" plus "a'" in the ligand of formula (III) is within the range of from about 8 (preferably 10) to about 15, and the sum of all "a" plus "a'" in the ligand of formula (IV) is within the range of from about 10 (preferably 12) to about 18.

each "b" is an integer independently selected from 0–9, preferably 0–5 (wherein when b=0, $(CR_n)_0$ represents a covalent bond), or in any of the above formulas, one or more of the $(CR_n)_b$ moieties covalently bonded from any D to the B atom is absent as long as at least two $(CR_n)_b$ covalently bond two of the D donor atoms to the B atom in the formula, and the sum of all "b" is within the range of from about 1 to about 5; and (iii) optionally, one or more non-macropolycyclic ligands; and (b) adjunct materials at suitable levels, as identified hereinabove.

The present invention also uses complexes formed by transition metals selected from: Mn(II), Mn(III), Mn(IV), Mn(V), Fe(II), Fe(III), Fe(IV), Co(I), Co(II), Co(III), Ni(I), Ni(II), Ni(III), Cu(I), Cu(II), Cu(III), Cr(II), Cr(III), Cr(IV), Cr(V), Cr(VI), V(III), V(IV), V(V), Mo(IV), Mo(V), Mo(VI), W(IV), W(V), W(VI), Pd(II), Ru(II), Ru(III), and Ru(IV), preferably Mn(II, Mn(III), Mn(IV), Fe(II), Fe(III), Fe(IV), Cu(I), Cu(II), Cu(III), Co(II), Co(III) preferably Mn(II), Mn(III), Fe(II), Fe(III), Cu(I), Cu(II), Co(II), Co(III) and the cross-bridged tetraazamacrocycle and cross-bridged pentaazamacrocycle ligands; these complexes include those in which the cross-bridging moiety is a C2–C4 alkyl moiety and in which there is a mole ratio of macrocycle to metal of 1:1, and moreover these are most preferably monometallic mononuclear complexes, though in general, dimetallic or multimetallic complexes are not excluded.

A preferred sub-group of the transition-metal complexes includes the Mn(II), Fe(II) and Cu(II) complexes of the ligand 1.2:

1.2

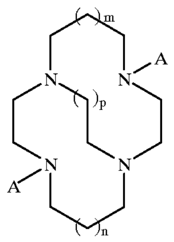

wherein m and n are integers from 0 to 2, p is an integer from 1 to 6, preferably m and n are both 0 or both 1 (preferably both 1 ), or m is 0 and n is at least 1; and p is 1;

and A is a nonhydrogen moiety preferably having no aromatic content; more particularly each A can vary independently and is preferably selected from methyl, ethyl, propyl, isopropyl, butyl, isobutyl, tert-buryl, C5–C20 alkyl, and one, but not both, of the A moieties is benzyl, and combinations thereof. In one such complex, one A is methyl and one A is benzyl.

All parts, percentages and ratios used herein are expressed as percent weight unless otherwise specified.

The catalytic systems of the present invention comprise a particularly selected transition metal oxidation catalyst which is a complex of a transition metal and a macropolycyclic rigid ligand, preferably one which is cross-bridged. The catalytic systems do not contain any added oxidants such as hydrogen peroxide sources, peroxy acids, peroxy acid precursors, monoperoxysulphate (e.g. Oxone™, manufactured by DuPont), chlorine, $ClO_2$ or hypochlorite. Therefore, the aqueous medium of the catalytic systems described herein are essentially devoid of conventional oxidation agents.

To secure the benefits of the invention, a substrate material, such as a chemical compound to be oxidized, or a commercial mixture of materials such as a paper pulp, or a soiled material such as a textile containing one or more materials or soils to be oxidized, is added to the catalytic system under widely ranging conditions further described hereinafter.

The present invention catalytic systems also have utility in the area of oxidizing (preferably including bleaching) wood pulp for use in, for example, paper making processes. Other utilities include oxidative destruction of waste materials or effluents.

Effective Amounts of Catalyst Materials

The term "catalytically effective amount", as used herein, refers to an amount of the transition-metal oxidation catalyst present in the present invention catalytic systems, or during use according to the present invention methods, that is sufficient, under whatever comparative or use conditions are employed, to result in at least partial oxidation of the material sought to be oxidized by the catalytic systems or method. For example, in the synthesis of epoxides from alkenes, the catalytic amount is that amount which is sufficient to catalyze the desired epoxidation reaction. As noted, the invention encompasses catalytic systems both at their in-use levels and at the levels which may commercially be provided for sale as "concentrates"; thus "catalytic systems" herein include both those in which the catalyst is highly dilute and ready to use, for example at ppb levels, and compositions having rather higher concentrations of catalyst and adjunct materials. intermediate level compositions, as noted in summary, can include those comprising from about 0.01 ppm to about 500 ppm, more preferably from about 0.05 ppm to about 50 ppm, more preferably still from about 0.1 ppm to about 10 ppm of transition-metal catalyst and the balance to 100%, typically about 99% or more, being solid-form or liquid-form adjunct materials for example fillers, solvents, and adjuncts especially adapted to a particular use, such as papermaking adjuncts, detergent adjuncts, or the like). In terms of amounts of materials, the invention also encompasses a large number of novel transition-metal catalysts per-se, especially including their substantially pure (100% active) forms. Other amounts, for example of oxidant materials and other adjuncts for specialized uses are illustrated in more detail hereinafter.

Transition-Metal Oxidation Catalysts

The present invention catalytic systems comprise a transition-metal oxidation catalyst. In general, the catalyst contains an at least partially covalently bonded transition metal, and bonded thereto at least one particularly defined macropolycyclic rigid ligand, preferably one having four or more donor atoms and which is cross-bridged or otherwise tied so that the primary macrocycle ring complexes in a folded conformation about the metal. Catalysts herein are thus neither of the more conventional macrocyclic type: e.g., porphyrin complexes, in which the metal can readily adopt square-planar configuration; nor are they complexes in which the metal is fully encrypted in a ligand. Rather, the presently useful catalysts represent a selection of all the many complexes, hitherto largely unrecognized, which have an intermediate state in which the metal is bound in a "cleft". Further, there can be present in the catalyst one or more additional ligands, of generally conventional type such as chloride covalently bound to the metal; and, if needed, one or more counter-ions, most commonly anions such as chloride, hexafluorophosphate, perchlorate or the like; and additional molecules to complete crystal formation as needed, such as water of crystallization. Only the transition-metal and macropolycyclic rigid ligand are, in general, essential.

Transition-metal oxidation catalysts useful in the invention catalytic systems can in general include known compounds where they conform with the invention definition, as well as, more preferably, any of a large number of novel compounds expressly designed for the present oxidation catalysis uses and non-limitingly illustrated by any of the following:

Dichloro-5,12-dimethyl-1,5,8,12-tetraazabicyclo[6.6.2]hexadecane Manganese(II)

Dichloro-4,10-dimethyl-1,4,7,10-tetraazabicyclo[5.5.2]tetradecane Manganese(II)

Diaquo-5,12-dimethyl-1,5,8,12-tetraazabicyclo[6.6.2]hexadecane Manganese(II) Hexafluorophosphate Aquo-hydroxy-5,12-dimethyl-1,5,8,12-tetraazabicyclo[6.6.2]hexadecane Manganese(III) Hexafluorophosphate Diaquo-4,10-dimethyl-1,4,7,10-tetraazabicyclo[5.5.2]tetradecane Manganese(II) Hexafluorophosphate Diaquo-5,12-dimethyl-1,5,8,12-tetraazabicyclo[6.6.2]hexadecane Manganese(II) Tetrafluoroborate Diaquo-4,10-dimethyl-1,4,7,10-tetraazabicyclo[5.5.2]tetradecane Manganese(II) Tetrafluoroborate Dichloro-5,12-dimethyl-1,5,8,12-tetraazabicyclo[6.6.2]hexadecane Manganese(III) Hexafluorophosphate Dichloro-5,12-di-n-butyl-1,5,8,12-tetraazabicyclo[6.6.2]hexadecane Manganese(II)

Dichloro-5,12-dibenzyl-1,5,8,12-tetraazabicyclo[6.6.2]hexadecane Manganese(II)

Ddichloro-5-n-butyl-12-methyl-1,5,8,12-tetraazabicyclo[6.6.2]hexadecane Manganese(II)

Dichloro-5-n-octyl-12-methyl-1,5,8,12-tetraazabicyclo[6.6.2]hexadecane Manganese (II) Dichloro-5-n-butyl-12-methyl-1,5,8,12-tetraazabicyclo[6.6.2]hexadecane Manganese (II)

Dichloro-5,12-dimethyl-1,5,8,12-tetraazabicyclo[6.6.2]hexadecane Iron(II)

Dichloro-4,10-dimethyl-1,4,7,10-tetraazabicyclo[5.5.2]tetradecane Iron(II)

Dichloro-5,12-dimethyl-1,5,8,12-tetraazabicyclo[6.6.2]hexadecane Copper(II)

Dichloro-4,10-dimethyl-1,4,7,10-tetraazabicyclo[5.5.2]tetradecane Copper(II)

Dichloro-5,12-dimethyl-1,5,8,12-tetraazabicyclo[6.6.2]hexadecane Cobalt(II)

Dichloro-4,10-dimethyl-1,4,7,10-tetraazabicyclo[5.5.2]tetradecane Cobalt(II)

Dichloro 5,12-dimethyl-4-phenyl-1,5,8,12-tetraazabicyclo[6.6.2]hexadecane Manganese(II)

Dichloro-4,10-dimethyl-3-phenyl-1,4,7,10-tetraazabicyclo[5.5.2]tetradecane Manganese(II)

Dichloro-5,12-dimethyl-4,9-diphenyl-1,5,8,12-tetraazabicyclo[6.6.2]hexadecane Manganese(II)

Dichloro-4,10-dimethyl-3,8-diphenyl-1,4,7,10-tetraazabicyclo[5.5.2]tetradecane Manganese(II)

Dichloro-5,12-dimethyl-2,11-diphenyl-1,5,8,12-tetraazabicyclo[6.6.2]hexadecane Manganese(II)

Dichloro-4,10-dimethyl-4,9-diphenyl-1,4,7,10-tetraazabicyclo[5.5.2]tetradecane Manganese(II)

Dichloro-2,4,5,9,11,12-hexamethyl-1,5,8,12-tetraazabicyclo[6.6.2]hexadecane Manganese(II)

Dichloro-2,3,5,9,10,12-hexamethyl-1,5,8,12-tetraazabicyclo[6.6.2]hexadecane Manganese (II)

Dichloro-2,2,4,5,9,9,11,12-octamethyl-1,5,8,12-tetraazabicyclo[6.6.2]hexadecane Manganese(II)

Dichloro-2,2,4,5,9,11,11,12-octamethyl-1,5,8,12-tetraazabicyclo[6.6.2]hexadecane Manganese(II)

Dichloro-3,3,5,10,10,12-hexamethyl-1,5,8,12-tetraazabicyclo[6.6.2]hexadecane Manganese(II)

Dichloro-3,5,10,12-tetramethyl-1,5,8,12-tetraazabicyclo[6.6.2]hexadecane Manganese(II)

Dichloro-3-butyl-5,10,12-trimethyl-1,5,8,12-tetraazabicyclo[6.6.2]hexadecane Manganese (II)

Dichloro-1,5,8,12-tetraazabicyclo[6.6.2]hexadecane Manganese (II)

Dichloro-1,4,7,10-tetraazabicyclo[5.5.2]tetradecane Manganese (II)

Dichloro-1,5,8,12-tetraazabicyclo[6.6.2]hexadecane Iron (II)

Dichloro-1,4,7,10-tetraazabicyclo[5.5.2]tetradecane Iron (II)

Aquo-chloro-2-(2-hydroxyphenyl)-5,12-dimethyl,5,8,12-tetraazabicyclo[6.6.2]hexadecane Manganese(II)

Aquo-chloro-10-(2-hydroxybenzyl)-4,10-dimethyl-1,4,7,10-tetraazabicyclo[5.5.2)tetradecane Manganese(II)

Chloro-2-(2-hydroxybenzyl)-5-methy 1,5,8,12-tetraazabicyclo[6.6.2]hexadecane Manganese(II)

Chloro-10-(2-hydroxybenzyl)-4-methyl-1,4,7,10-tetraazabicyclo[5.5.2]tetradecane Manganese(II)

Chloro-5-methyl-12-(2-picolyl)-1,5,8,12-tetraazabicyclo[6.6.2]hexadecane Manganese(II) Chloride Chloro-4-methyl-10-(2-picolyl)-1,4,7,10-tetraazabicyclo[5.5.2]tetradecane Manganese (II) Chloride Dichloro-5-(2-sulphato)dodecyl-12-methyl-I,5,8,12-tetraazabicyclo[6.6.2]hexadecane Manganese(III)

Aquo-Chloro-5-(2-sulphato)dodecyl-12-methyl-1,5,8,12-tetraazabicyclo[6.6.2]hexadecane Manganese(II)

Aquo-Chloro-5-(3-sulphonopropyl)-12-methyl-1,5,8,12-tetraazabicyclo[6.6.2]hexadecane Manganese(II)

Dichloro-5-(Trimethylammoniopropyl)dodecyl-12-methyl-1,5,8,12-tetraazabicyclo[6.6.2]hexadecane Manganese(III) Chloride Dichloro-5,12-dimethyl-1,4,7,10,13-pentaazabicyclo[8.5.2]heptadecane Manganese (II)

Dichloro-14,20-dimethyl-1,10,14,20-tetraazatriyclo[8.6.6]docosa-3(8),4,6-triene Manganese(II)

Dichloro-4.11-dimethyl-1,4,7,11-tetraazabicyclo[6.5.2]pentadecane Manganese(II)

Dichloro-5,12-dimethyl-1,5,8,12-tetraazabicyclo[7.6.2]heptadecane Manganese(II)

Dichloro-5.13-dimethyl-1,5,9,13-tetraazabicyclo[7.7.2]heptadecane Manganese(II)

Dichloro-3,10-bis(butylcarboxy)-5,12-dimethyl-1,5,8,12-tetraazabicyclo[6.6.2]hexadecane Manganese(II)

Diaquo-3,10-dicarboxy-5,12-dimethyl-1,5,8,12-tetraazabicyclo[6.6.2]hexadecane Manganese(II)

Chloro-20-methyl-1,9,20,24,25-pentaazatetracyclo[7.7.1$^{3,7}$.1$^{11,15}$]pentacosa-3,5,7(24),11,1315(25)-hexaene manganese(II) Hexafluorophosphate Trifluoromethanesulphono-20-methyl-1,9,20,24,25-pentaazatetracyclo[7.7.7.1$^{3,7}$.1$^{11,15}$]pentacosa-3,5,7(24),11,13,15(25)-hexaene Manganese(II) trifluoromethanesulphonate Trifluoromethanesulphono-20-methyl-1,9,20,24,25-pentaazatetracyclo[7.7.7.1$^{3,7}$.1$^{11,15}$.]pentacosa-3,5,7(24),11,13,15(25)-hexaene Iron(II) trifluoromethanesulphonate Chloro-5,12,17-trimethyl-1,5,8,12,17-pentaazabicyclo[6.6.5]nonadecane Manganese(II) hexafluorophosphate Chloro-4,10,15-trimethyl-1,4,7,10,15-pentaazabicyclo[5.5.5]heptadecane Manganese (II) hexafluorophosphate Chloro-5,12,17-trimethyl-1,5,8,12,17-pentaazabicyclo[6.6.5]nonadecane Manganese(II) chloride Chloro-4,10,15-trimethyl-1,4,7,10,15-pentaazabicyclo[5.5.5]heptadecane Manganese(II) chloride Preferred complexes useful as transition-metal oxidation catalysts more generally include not only monometallic, mononuclear kinds such as those illustrated hereinabove but also bimetallic, trimetallic or cluster kinds, especially when the polymetallic kinds transform chemically in the presence of medium (water, hydroxyl anions, surfactants, etc) to form a mononuclear, monometallic active species. Monometallic, mononuclear complexes are preferred. As defined herein, a monometallic transition-metal oxidation catalyst contains only one transition metal atom per mole of complex. A monometallic, mononuclear complex is one in which any donor atoms of the essential macrocyclic ligand are bonded to the same transition metal atom, that is, the essential ligand does not "bridge" across two or more transition-metal atoms transition metals of the catalyst. Just as the macropolycyclic ligand cannot vary indeterminately for the present useful purposes, nor can the metal. An important part of the invention is to arrive at a match between ligand selection and metal selection which results in excellent oxidation catalysis. In general, transition-metal oxidation catalysts herein comprise a transition metal selected from the group consisting of Mn(II), Mn(III), Mn(IV), Mn(V), Fe(II), Fe(III), Fe(IV), Co(I), Co(II), Co(III), Ni(I), Ni(II), Ni(III), Cu(I), Cu(II), Cu(III), Cr(II), Cr(III), Cr(IV), Cr(V), Cr(VI), V(III), V(IV),V(V), Mo(IV), Mo(V), Mo(VI), W(IV), W(V), W(VI), Pd(II), Ru(II), Ru(III), and Ru(IV). Preferred transition-metals in the instant transition-metal oxidation catalyst include manganese, iron, copper, and cobalt. Preferred oxidation states include the (II) and (III) oxidation states. Manganese(II) in both the low-spin configuration and high spin complexes are included. It is to be noted that complexes such as low-spin Mn(II) complexes are rather rare in all of coordination chemistry. The designation (II) or (III) denotes a coordinated transition metal having the requisite oxidation state; the coordinated metal atom is not a free ion or one having only water as a ligand.

Ligands

In general, as used herein, a "ligand" is any moiety capable of direct covalent bonding to a metal ion. Ligands can be charged or neutral and may range widely, including simple monovalent donors, such as chloride, or simple amines which form a single coordinate bond and a single point of attachment to a metal; to oxygen or ethylene, which can form a three-membered ring with a metal and thus can be said to have two potential points of attachment, to larger moieties such as ethylenediamine or aza macrocycles, which form up to the maximum number of single bonds to one or more metals that are allowed by the available sites on the metal and the number of lone pairs or alternate bonding sites of the free ligand. Numerous ligands can form bonds other than simple donor bonds, and can have multiple points of attachment.

Ligands useful herein can fall into several groups: the essential macropolycyclic rigid ligand, preferably a cross-bridged macropolycycle (preferably there will be one such ligand in a useful transition-metal complex, but more, for example two, can be present, but not in preferred mono-nuclear complexes); other, optional ligands, which in general are different from the essential cross-bridged macropolycycle (generally there will be from 0 to 4, preferably from 1 to 3 such ligands); and ligands associated transiently with the metal as part of the catalytic cycle, these latter typically being related to water, hydroxide, oxygen, water, hydroxide, or peroxides. Ligands of the third group are not essential for defining the metal oxidation catalyst, which is a stable, isolable chemical compound that can be fully characterized. Ligands which bind to metals through donor atoms each having at least a single lone pair of electrons available for donation to a metal have a donor capability, or potential denticity, at least equal to the number of donor atoms. in general, that donor capability may be fully or only partially exercised.

Macropolycyclic Rigid Ligands

To arrive at the instant transition-metal catalysts, a macropolycyclic rigid ligand is essential. This is coordinated (covalently connected to any of the above-identified transition-metals) by at least three, preferably at least four, and most preferably four or five, donor atoms to the same transition metal.

Generally, the macropolycyclic rigid ligands herein can be viewed as the result of imposing additional structural rigidity on specifically selected "parent macrocycles". The term "rigid" herein has been defined as the constrained converse of flexibility: see D. H. Busch, Chemical Reviews (1993), p 847–860, incorporated by reference. More particularly, "rigid" as used herein means that the essential ligand, to be suitable for the purposes of the invention, must be determinably more rigid than a macrocycle ("parent macrocycle") which is otherwise identical (having the same ring size and type and number of atoms in the main ring) but lacks the superstructure (especially linking moieties or, preferably cross-bridging moieties) of the present ligands. In determining the comparative rigidity of the macrocycles with and without superstructures, the practitioner will use the free form (not the metal-bound form) of the macrocycles. Rigidity is well-known to be useful in comparing macrocycles; suitable tools for determining, measuring or comparing rigidity include computational methods (see, for example, Zimmer, Chemical Review, (1995), 95(38), 2629–2648 or Hancock et al., Inorganica Chimica Acta (1989), 164, 73–84). A determination of whether one macrocycle is more rigid than another can be often made by simply making a molecular model, thus it is not in general essential to know configurational energies in absolute terms or to precisely compute them. Excellent comparative determinations of rigidity of one macrocycle vs. another can be made using inexpensive personal computer-based computational tools, such as ALCHEMY III, commercially available from Tripos Associates. Tripos also has available more expensive software permitting not only comparative, but absolute determinations; ultimately, SHAPES can be used (see Zimmer cited supra). One observation which is significant in the context of the present invention is that there is an optimum for the present purposes when the parent macrocycle is distinctly flexible as compared to the cross-bridged form. Thus, unexpectedly, it is preferred to use parent macrocycles containing at least four donor atoms, such as cyclam derivatives, and to cross-bridge them, rather than to start with a more rigid parent macrocycle. Another observation is that cross-bridged macrocycles are significantly preferred over macrocycles which are bridged in other manners.

The macrocyclic rigid ligands herein are of course not limited to being synthesised from any performed macrocycle plus performed "rigidizing" or "conformation-modifying" element: rather, a wide variety of synthetic means, such as template syntheses, are useful. See for example Busch et al., reviewed in "Heterocyclic compounds: Aza-crown macrocycles", J. S. Bradshaw et. al., referred to in the Background Section hereinbefore for synthetic methods.

In an embodiment of the present invention, the macropolycyclic rigid ligands herein include those comprising:

(i) an organic macrocycle ring containing three, preferably four, or more donor atoms (preferably at least 3, more preferably at least 4, of these donor atoms are N) separated from each other by covalent linkages of at least one, preferably 2 or 3, non-donor atoms, two to five (preferably three to four, more preferably four) of these donor atoms being coordinated to the same transition metal in the complex; and (ii) a linking moiety, preferably a cross-bridging chain, which covalently connects at least 2 (preferably non-adjacent) donor atoms of the organic macrocycle ring, said covalently connected (preferably non-adjacent) donor atoms being bridgehead donor atoms which are coordinated to the same transition metal in the complex, and wherein said linking moiety (preferably a cross-bridged chain) comprises from 2 to about 10 atoms (preferably the cross-bridged chain is selected from 2, 3 or 4 non-donor atoms, and 4–6 non-donor atoms with a further donor atom).

While clear from the various contexts and illustrations already presented, the practitioner may further benefit if certain terms receive additional definition and illustration. As used herein, "macrocyclic rings" are covalently connected rings formed from three or more, preferably four or more, donor atoms (i.e., heteroatoms such as nitrogen or oxygen) with carbon chains connecting them, and any macrocycle ring as defined herein must contain a total of at least ten, preferably at least twelve, atoms in the macrocycle ring. A macropolycyclic rigid ligand herein may contain more than one ring of any sort per ligand, but at least one macrocycle ring must be identifiable. Moreover, in the preferred embodiments, no two hetero-atoms are directly connected. Preferred transition-metal oxidation catalysts are those wherein the macropolycyclic rigid ligand comprises an organic macrocycle ring (main ring) containing at least 10–20 atoms, preferably 12–18 atoms, more preferably from about 12 to about 20 atoms, most preferably 12 to 16 atoms.

"Donor atoms" herein are heteroatoms such as nitrogen, oxygen, phosphorus or sulphur, which when incorporated into a ligand still have at least one lone pair of electrons available for forming a donor-acceptor bond with a metal. Preferred transition-metal oxidation catalyst are those wherein the donor atoms in the organic macrocycle ring of the cross-bridged macropolycyclic ligand are selected from the group consisting of N, O; S, and P, preferably N and O, and most preferably all N. Also preferred are cross-bridged macropolycyclic ligands comprising 4 or 5 donor atoms, all of which are coordinated to the same transition metal. Most preferred transition-metal oxidation catalysts are those wherein the cross-bridged macropolycyclic ligand comprises 4 nitrogen donor atoms all coordinated to the same transition metal, and those wherein the cross-bridged macropolycyclic ligand comprises 5 nitrogen atoms all coordinated to the same transition metal.

"Non-donor atoms" of the macropolycyclic rigid ligand herein are most commonly carbon, though a number of atom types can be included, especially in optional exocyclic substituents (such as "pendant" moieties, illustrated hereinafter) of the macrocycles, which are neither donor atoms for purposes essential to form the metal catalysts, nor are they carbon. Thus, in the broadest sense, the term "non-donor atoms" can refer to any atom not essential to forming donor bonds with the metal of the catalyst. Examples of such atoms could include heteroatoms such as sulphur as incorporated in a non-coordinatable sulphonate group, phosphorus as incorporated into a phosphonium salt moiety, phosphorus as incorporated into a V(V) oxide, a non-transition metal, or the like. In certain preferred embodiments, all non-donor atoms are carbon.

The term "macropolycyclic ligand" is used herein to refer to the essential ligand required for forming the essential metal catalyst. As indicated by the term, such a ligand is both a macrocycle and is polycyclic. "Polycyclic" means at least bicyclic in the conventional sense. The essential macropolycyclic ligands must be rigid, and preferred ligands must also cross-bridged.

Non-limiting examples of macropolycyclic rigid ligands, as defined herein, include 1.3–1.7:

1.3

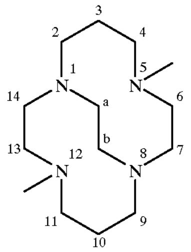

Ligand 1.3 is a macropolycylic rigid ligand in accordance with the invention which is a highly preferred, cross-bridged, methyl-substituted (all nitrogen atoms tertiary) derivative of cyclam. Formally, this ligand is named 5,12-dimethyl-1,5,8,12-tetraazabicyclo[6.6.2]hexadecane using the extended von Baeyer system. see "A Guide to IUPAC Nomenclature of Organic Compounds: recommendations 1993", R. Panico, W. H. Powell and J-C Richer {Eds.}, Blackwell Scientific Publications, Boston, 1993; see especially section R-2.4.2.1. According to conventional terminology, N1 and N8 are "bridgehead atoms"; as defined herein, more particularly "bridgehead donor atoms" since they have lone pairs capable of donation to a metal. N1 is connected to two non-bridgehead donor atoms, N5 and N12, by distinct saturated carbon chains 2, 3, 4 and 14, 13 and to bridgehead donor atom N8 by a "linking moiety" a, b which here is a saturated carbon chain of two carbon atoms. N8 is connected to two non-bridgehead donor atoms, N5 and N12, by distinct chains 6, 7 and 9, 10, 11. Chain a, b is a "linking moiety" as defined herein, and is of the special, preferred type referred to as a "cross-bridging" moiety. The "macrocyclic ring" of the ligand supra, or "main ring" (IUPAC), includes all four donor atoms and chains 2, 3, 4; 6, 7; 9, 10, 11 and 13, 14 but not a, b. This ligand is conventionally bicyclic. The short bridge or "linking moiety" a, b is a "cross-bridge" as defined herein, with a, b bisecting the macrocyclic ring.

1.4

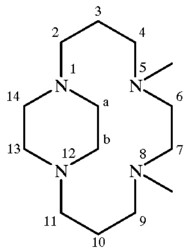

Ligand 1.4 lies within the general definition of macropolycyclic rigid ligands as defined herein, but is not a preferred ligand since it is not "cross-bridged" as defined herein. Specifically, the "linking moiety" a, b connects "adjacent" donor atoms N1 and N12, which is outside the preferred embodiment of the present invention: see for comparison the preceding macrocyclic rigid ligand, in which the linking moiety a, b is a cross-bridging moiety and connects "non-adjacent" donor atoms.

1.5

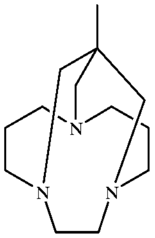

Ligand 1.5 lies within the general definition of macropolycyclic rigid ligands as defined herein, but is not a preferred ligand since it contains only three donor atoms, all of which are bridgehead donor atoms.

1.6

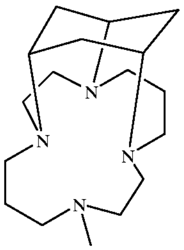

Ligand 1.6 lies within the general definition of macropolycylic rigid ligands as defined herein. This ligand can be viewed as a "main ring" which is a tetraazamacrocycle having three bridgehead donor atoms. This macrocycle is bridged by a "linking moiety" having a structure more complex than a simple chain, containing as it does a secondary ring. The linking moiety includes both a "cross-bridging" mode of bonding, and a non-cross-bridging mode.

1.7

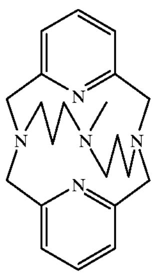

Ligand 1.7 lies within the general definition of macropolycylic rigid ligands. Five donor atoms are present; two being bridgehead donor atoms. This ligand is a preferred cross-bridged ligand. It contains no exocyclic or pendant substituents which have aromatic content.

In contrast, for purposes of comparison, the following ligands (1.8 and 1.9) conform neither with the broad definition of macropolycyclic rigid ligands in the present invention, nor with the preferred cross-bridged sub-family thereof and therefore are completely outside the present invention:

1.8

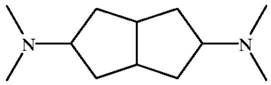

In the ligand supra, neither nitrogen atom is a bridgehead donor atom. There are insufficient donor atoms.

1.9

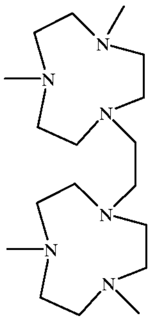

The ligand supra is also outside the present invention. The nitrogen atoms are not bridgehead donor atoms, and the two-carbon linkage between the two main rings does not meet the invention definition of a "linking moiety" since, instead of linking across a single macrocycle ring, it links two different rings. The linkage therefore does not confer rigidity as used in the term "macropolycyclic rigid ligand". See the definition of "linking moiety" hereinafter.

Generally, the essential macropolycyclic rigid ligands (and the corresponding transition-metal catalysts) herein comprise:

(a) at least one macrocycle main ring comprising three or more heteroatoms; and (b) a covalently connected non-metal superstructure capable of increasing the rigidity of the macrocycle, preferably selected from (i) a bridging superstructure, such as a linking moiety;

(ii) a cross-bridging superstructure, such as a cross-bridging linking moiety; and (iii) combinations thereof.

The term "superstructure" is used herein as defined by Busch et al., in the Chemical Reviews article incorporated hereinabove.

Preferred superstructures herein not only enhance the rigidity of the parent macrocycle, but also favor folding of the macrocycle so that it co-ordinates to a metal in a cleft. Suitable superstructures can be remarkably simple, for example a linking moiety such as any of those illustrated in 1.10 and 1.11 below, can be used.

1.10

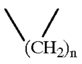

wherein n is an integer, for example from 2 to 8, preferably less than 6, typically 2 to 4, or 1.11

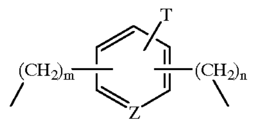

wherein m and n are integers from about 1 to 8, more preferably from 1 to 3; Z is N or CH; and T is a compatible substituent, for example H, alkyl, triaikylammonium, halogen, nitro, sulphonate, or the like. The aromatic ring in I.11 can be replaced by a saturated ring, in which the atom in Z connecting into the ring can contain N, O, S or C.

Without intending to be limited by theory, it is believed that the preorganization built into the macropolycyclic ligands herein that leads to extra kinetic and/or thermodynamic stability of their metal complexes arises from either or both of topological constraints and enhanced rigidity (loss of flexibility) compared to the free parent macrocycle which has no superstructure. The macropolycyclic rigid ligands as defined herein and their preferred cross-bridged sub-family, which can be said to be "ultra-rigid", combine two sources of fixed preorganization. In preferred ligands herein, the linking moieties and parent macrocycle rings are combined to form ligands which have a significant extent of "fold", typically greater than in many known superstructured ligands in which a superstructure is attached to a largely planar, often unsaturated macrocycle. See, for example, D. H. Busch, Chemical Reviews. (1993), 93, 847–880. Further, the preferred ligands herein have a number of particular properties, including (1) they are characterized by very high proton affinities, as in so-called "proton sponges"; (2) they tend to react slowly with multivalent transition metals, which when combined with (1) above, renders synthesis of their complexes with certain hydrolyzable metal ions difficult in hydroxylic solvents; (3) when they are coordinated to transition metal atoms as identified herein, the ligands result in complexes that have exceptional kinetic stability such that the metal ions only dissociate extremely slowly under conditions that would destroy complexes with ordinary ligands; and (4) these complexes have exceptional thermodynamic stability; however, the unusual kinetics of ligand dissociation from the transition metal may defeat conventional equilibrium measurements that might quantitate this property.

Other usable but more complex superstructures suitable for the present invention purposes include those containing an additional ring, such as in 1.6. Other bridging superstructures when added to a macrocycle include, for example, 1.4. In contrast, cross-bridging superstructures unexpectedly produce a substantial improvement in the utility of a macrocyclic ligand for use in oxidation catalysis: a preferred cross-bridging superstructure is 1.3.

A superstructure illustrative of a bridging plus cross-bridging combination is 1.12:

1.12

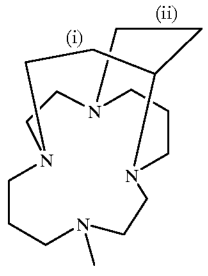

in 1.12, linking moiety (i) is cross-bridging, while linking moiety (ii) is not.1.12 is less preferred than 1.3.

More generally, a "linking moiety", as defined herein, is a covalently linked moiety comprising a plurality of atoms which has at least two points of covalent attachment to a macrocycle ring and which does not form part of the main ring or rings of the parent macrocycle. In other terms, with the exception of the bonds formed by attaching it to the parent macrocycle, a linking moiety is wholly in a superstructure.

The terms "cross-bridged" or "cross-bridging", as used herein, refers to covalent ligation, bisection or "tying" of a macrocycle ring in which two donor atoms of the macrocycle ring are covalently connected by a linking moiety, for example an additional chain distinct from the macrocycle ring, and further, preferably, in which there is at least one donor atom of the macrocycle ring in each of the sections of the macrocycle ring separated by the ligation, bisection or tying, cross-bridging is not present in structure 1.4 hereinabove; it is present in 1.3, where two donor atoms of a preferred macrocycle ring are connected in such manner that there is not a donor atom in each of the bisection rings. Of course, provided that cross-bridging is present, any other kind of bridging can optionally be added and the bridged macrocycle will retain the preferred property of being "cross-bridged": see structure 1.12. A "cross-bridged chain" or "cross-bridging chain", as defined herein, is thus a highly preferred type of linking moiety comprising a plurality of atoms which has at least two points of covalent attachment to a macrocycle ring and which does not form part of the original macrocycle ring (main ring), and further, which is connected to the main ring using the rule identified in defining the term "cross-bridging".

The term "adjacent" as used herein in connection with donor atoms in a macrocycle ring means that there are no donor atoms intervening between a first donor atom and another donor atom within the macrocycle ring; all intervening atoms in the ring are non-donor atoms, typically they are carbon atoms. The complementary term "non-adjacent" as used herein in connection with donor atoms in a macrocycle ring means that there is at least one donor atom intervening between a first donor atom and another that is being referred to. In preferred cases such as a cross-bridged tetraazamacrocycle, there will be at least a pair of non-adjacent donor atoms which are bridgehead atoms, and a further pair of non-bridgehead donor atoms.

"Bridgehead" atoms herein are atoms of a macropolycyclic ligand which are connected into the structure of the macrocycle in such manner that each non-donor bond to such an atom is a covalent single bond and there are sufficient covalent single bonds to connect the atom termed "bridgehead" such that it forms a junction of at least two rings, this number being the maximum observable by visual inspection in the un-coordinated ligand.

In general, the metal oxidation catalysts herein may contain bridgehead atoms which are carbon, however, and importantly, in certain preferred embodiments, all essential bridgehead atoms are heteroatoms, all heteroatoms are tertiary, and further, they each co-ordinate through lone pair donation to the metal. Thus, bridgehead atoms are junction points not only of rings in the macrocycle, but also of chelate rings.

The term "a further donor atom" unless otherwise specifically indicated, as used herein, refers to a donor atom other than a donor atom contained in the macrocycle ring of an essential macropolycycle. For example, a "further donor atom" may be present in an optional exocyclic substituent of a macrocyclic ligand, or in a cross-bridged chain thereof. In certain preferred embodiments, a "further donor atom" is present only in a cross-bridged chain.

The term "coordinated with the same transition metal" as used herein is used to emphasize that a particular donor atom or ligand does not bind to two or more distinct metal atoms, but rather, to only one.

Optional Ligands

It is to be recognized for the transition-metal oxidation catalysts useful in the present invention catalytic systems that additional non-macropolycyclic ligands may optionally also be coordinated to the metal, as necessary to complete the coordination number of the metal complexes. Such ligands may have any number of atoms capable of donating electrons to the catalyst complex, but preferred optional ligands have a denticity of 1 to 3, preferably 1. Examples of such ligands are $H_2O$, ROH, $NR_3$, RCN, $OH^-$, $OOH^-$, $RS^-$, $RO^-$, $RCOO^-$, $OCN^-$, $SCN^-$, $N_3^-$, $CN^-$, $F^-$, $Cl^-$, $Br^-$, $I^-$, $O_2^-$, $NO_3^-$, $NO_2^-$, $SO_4^{2-}$, $SO_3^{2-}$, $PO_4^{3-}$, organic phosphates, organic phosphonates, organic sulphates, organic sulphonates, and aromatic N donors such as pyridines, pyrazines, pyrazoles, imidazoles, benzimidazoles, pyrimidines, triazoles and thiazoles with R being H, optionally substituted alkyl, optionally substituted aryl. Preferred transition-metal oxidation catalysts comprise one or two non-macropolycyclic ligands.

The term "non-macropolycyclic ligands" is used herein to refer to ligands such as those illustrated immediately hereinabove which in general are not essential for forming the metal catalyst, and are not cross-bridged macropolycycles. "Not essential", with reference to such non-macropolycyclic ligands means that, in the invention as broadly defined, they can be substituted by a variety of common alternate ligands. In highly preferred embodiments in which metal, macropolycyclic and non-macropolycyclic ligands are finely tuned into a transition-metal oxidation catalyst, there may of course be significant differences in performance when the indicated non-macropolycyclic ligand(s) are replaced by further, especially non-illustrated, alternative ligands.

The term "metal catalyst" or "transition-metal oxidation catalyst" is used herein to refer to the essential catalyst compound of the invention and is commonly used with the "metal" qualifier unless absolutely clear from the context.

Note that there is a disclosure hereinafter pertaining specifically to optional catalyst materials. Therein the term "bleach catalyst" may be used unqualified to refer to optional organic (metal-free) catalyst materials, or to optional metal-containing catalysts that lack the advantages of the essential catalyst: such optional materials, for example, include known metal porphyrins or metal-containing photobleaches. Other optional catalytic materials herein include enzymes.

The macropolycyclic rigid ligands of the inventive compositions and methods also include ligands selected from the group consisting of:

(i) the macropolycyclic rigid ligand of formula (I) having denticity of 3 or, preferably, 4:

(I)

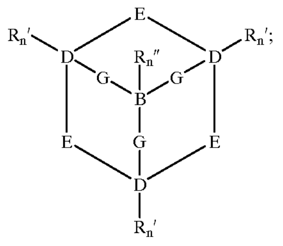

(ii) the macropolycyclic rigid ligand of formula (II) having denticity of 4 or 5

(II)

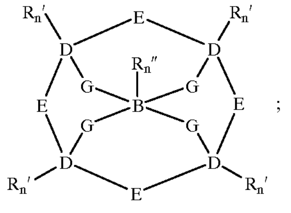

(iii) the macropolycyclic rigid ligand of formula (III) having denticity of 5 or 6

(III)

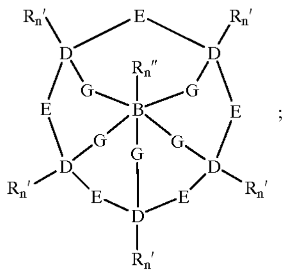

(iv) the macropolycyclic rigid ligand of formula (IV) having denticity of 6 or 7

(IV)

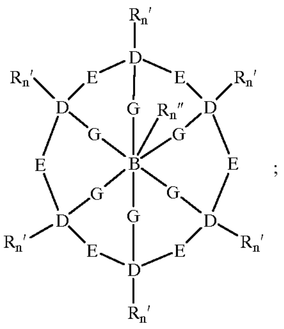

wherein in these formulas:

each "E" is the moiety $(CR_n)_a$—X—$(CR_n)_{a'}$, wherein X is selected from the group consisting of O, S, NR and P, or a covalent bond, and preferably X is a covalent bond and for each E the sum of a+a' is independently selected from 1 to 5, more preferably 2 and 3;

each "G" is the moiety $(CR_n)_b$;

each "R" is independently selected from H, alkyl, alkenyl, alkynyl, aryl, alkylaryl (e.g., benzyl), and heteroaryl, or two or more R are covalently bonded to form an aromatic, heteroaromatic, cycloalkyl, or heterocycloalkyl ring;

each "D" is a donor atom independently selected from the group consisting of N, O, S, and P, and at least two D atoms are bridgehead donor atoms coordinated to the transition metal;

"B" is a carbon atom or "D" donor atom, or a cycloalkyl or heterocyclic ring;

each "n" is an integer independently selected from 1 and 2, completing the valence of the carbon atoms to which the R moieties are covalently bonded;

each "n'" is an integer independently selected from 0 and 1, completing the valence of the D donor atoms to which the R moieties are covalently bonded;

each "n"" is an integer independently selected from 0, 1, and 2 completing the valence of the B atoms to which the R moieties are covalently bonded;

each "a" and "a'" is an integer independently selected from 0–5, preferably a+a' equals 2 or 3, wherein the sum of all "a" plus "a" in the ligand of formula (I) is within the range of from about 7 to about 12, the sum of all "a" plus "a'" in the ligand of formula (II) is within the range of from about 6 (preferably 8) to about 12, the sum of all "a" plus "a'" in the ligand uf formula (III) is within the range of from about 8 (preferably 10) to about 15, and the sum of all "a" plus "a'" in the ligand of formula (IV) is within the range of from about 10 (preferably 12) to about 18;

each "b" is an integer independently selected from 0–5, or in any of the above formulas, one or more of the $(CR_n)_b$ moieties covalently bonded from any D to the b atom is absent as long as at least two $(CR_n)_b$ covalently bond two of he D donor atoms to the B atom in the formula, and the sum of all "b" is within the range of from about 1 to about 5. Preferred ligands of the above formulas are those which are cross-bridged macropolycyclic ligands having Formulas (II), (III) or (IV).

It is to be noted herein that for the above formulas wherein "a" or "a'" is 1 these ligands are not preferred for potential instability reasons in selected solvents, but are still within the scope of the present invention.

Preferred are the transition-metal oxidation catalysts wherein in the cross-bridged macropolycyclic ligand the D and B are selected from the group consisting of N and O, and preferably all D are N. Also preferred are wherein in the cross-bridged macropolycyclic ligand all "a" are independently selected from the integers 2 and 3, all X are selected from covalent bonds, all "a'" are 0, and all "b" are independently selected from the integers 0, 1, and 2. Tetradentate and pentadentate cross-bridged macropolycyclic ligands are most preferred.

Unless otherwise specified, the convention herein when referring to denticity, as in "the macropolycycle has a denticity of four" will be to refer to a characteristic of the ligand: namely, the maximum number of donor bonds that it is capable of forming when it coordinates to a metal. Such a ligand is identified as "tetradentate". Similarly, a macropolycycle containing five nitrogen atoms each with a lone pair is preferred to as "pentadentate". The present invention encompasses catalytic systems in which the macrocyclic rigid ligand exerts its full denticity, as stated, in the transition-metal catalyst complexes; moreover, the invention also encompasses any equivalents which can be formed, for example, if one or more donor sites are not directly coordinated to the metal. This can happen, for example, when a pentadentate ligand coordinates through four donor atoms to the transition metal and one donor atom is protonated.

To further illustrate, preferred catalytic systems may contain metal catalysts wherein the cross-bridged macropolycyclic ligand is a bicyclic ligand; preferably the cross-bridged macropolycyclic ligand is a macropolycyclic moiety of the formula:

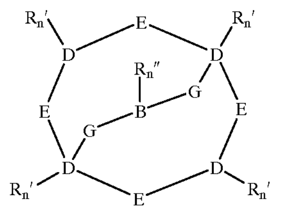

wherein each "a" is independently selected from the integers 2 or 3, and each "b" is independently selected from the integers 0, 1 and 2.

Further preferred are the compositions containing cross-bridged macropoly-cyclic ligands having the formula:

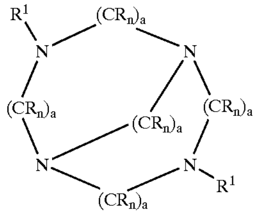

wherein in this formula:

each "n" is an integer independently selected from 1 and 2, completing the valence of the carbon atom to which the R moieties are covalently bonded;

each "R" and "RI" is independently selected from H, alkyl, alkenyl, alkynyl, aryl, alkylaryl (e.g., benzyl) and heteroaryl. or R and/or R1 are covalently bonded to form an aromatic, heteroaromatic, cycloalkyl, or heterocycloalkyl ring, and wherein preferably all R are H and R1 are independently selected from linear or branched, substituted or unsubstituted C1–C20 alkyl, alkenyl or alkynyl;

each "a" is an integer independently selected from 2 or 3;

preferably all nitrogen atoms in the cross-bridged macropolycycle rings are coordinated with the transition metal.

The invention further includes the methods and compositions which include the transition-metal complexes, preferably the Mn, Fe, Cu and Co complexes, or preferred cross-bridged macropolycyclic ligands having the formula:

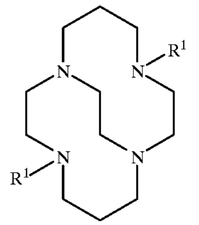

wherein in this formula "R1" is independently selected from H, and linear or branched, substituted or unsubstituted C1–C20 alkyl, alkylaryl, alkenyl or alkynyl, more preferably RI is alkyl or alkylaryl; and preferably all nitrogen atoms in the macropolycyclic rings are coordinated with the transition metal.

Also preferred are cross-bridged macropolycyclic ligands having the formula:

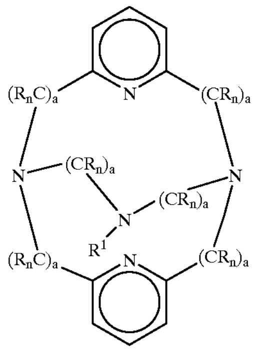

wherein in this formula:

each "n" is an integer independently selected from 1 and 2, completing the valence of the carbon atom to which the R moieties are covalently bonded;

each "R" and "R1" is independently selected from H, alkyl, alkenyl, alkynyl, aryl, alkylaryl (e.g., benzyl), and heteroaryl, or R and/or R1 are covalently bonded to form an aromatic, heteroaromatic, cycloalkyl, or heterocycloalkyl ring, and wherein preferably all R are H and R1 are independently selected from linear or branched, substituted or unsubstituted C1–C20 alkyl, alkenyl or alkynyl;

each "a" is an integer independently selected from 2 or 3;

preferably all nitrogen atoms in the macropolycyclic rings are coordinated with the transition metal. In terms of the present invention, even though any of such ligands are known, the invention encompasses the use of these ligands in the form of their transition-metal complexes as oxidation catalysts, or in the form of the defined catalytic systems.

In like manner, included in the definition of the preferred cross-bridged macropolycyclic ligands are those having the formula:

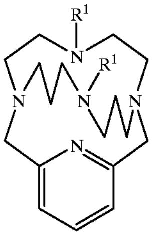

or

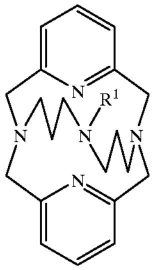

wherein in either of these formulae, "$R^1$" is independently selected from H, or, preferably, linear or branched, substituted or unsubstituted C1–C20 alkyl, alkenyl or alkynyl; and preferably all nitrogen atoms in the macropolycyclic rings are coordinated with the transition metal.

The present invention has numerous variations and alternate embodiments. Thus, in the foregoing catalytic systems, the macropolycyclic ligand can be replaced by any of the following:

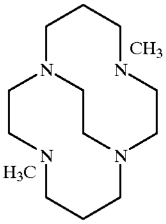
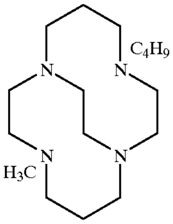
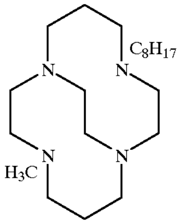

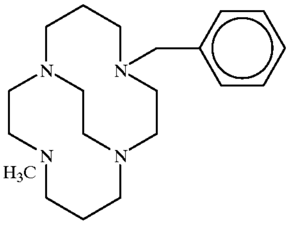
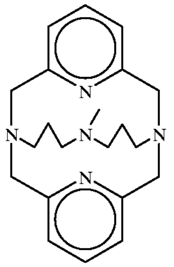

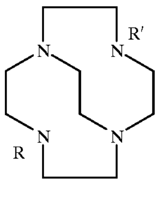
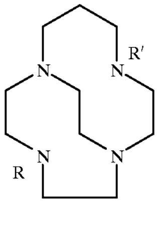
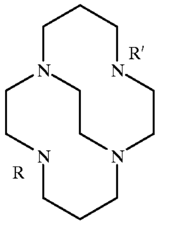

-continued

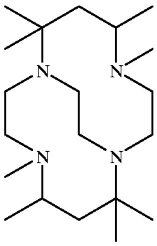
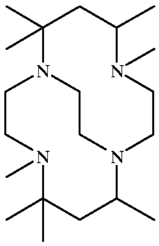
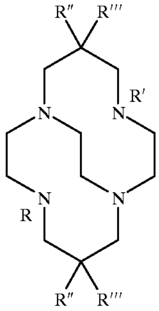

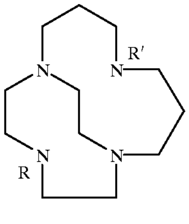
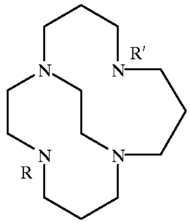

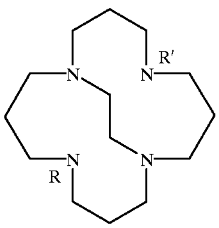
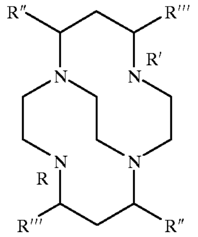

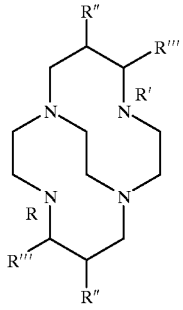
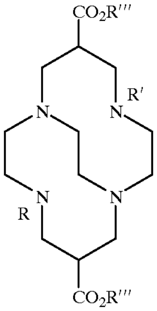

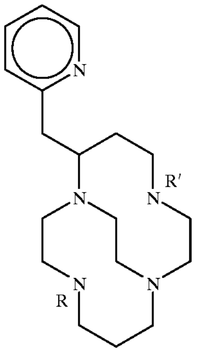
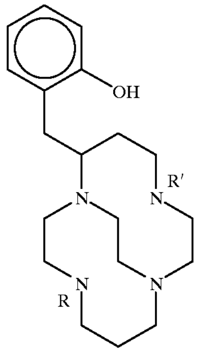

-continued

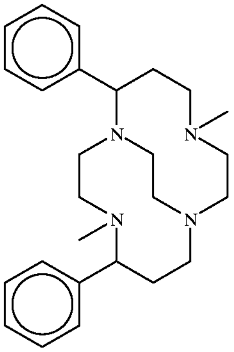

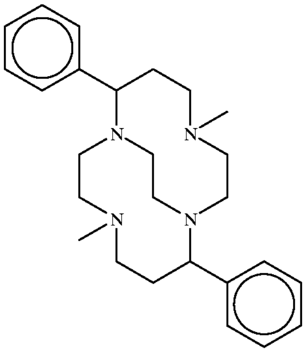

In the above, the R, R', R", R'" moieties can, for example, be methyl, ethyl or propyl. (Note that in the above formalism, the short straight strokes attached to certain N atoms are an alternate representation for a methyl group).

While the above illustrative structures involve tetra-aza derivatives (four donor nitrogen atoms), ligands and the corresponding complexes in accordance with the present invention can also be made, for example from any of the following:

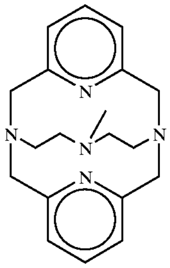

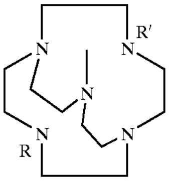

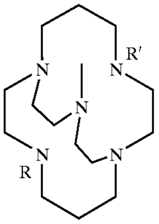

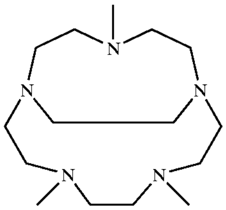

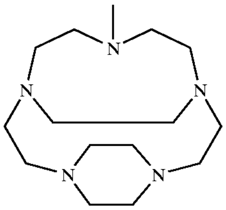

Moreover, using only a single organic macropolycycle, preferably a cross-bridged derivative of cyclam, a wide range of oxidation catalyst compounds of the invention may be prepared; numerous of these are believed to be novel chemical compounds. Preferred transition-metal catalysts of both cyclam-derived and non-cyclam-derived cross-bridged kinds are illustrated, but not limited, by the following:

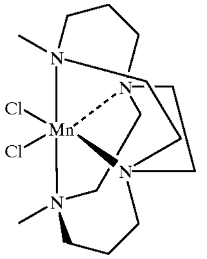

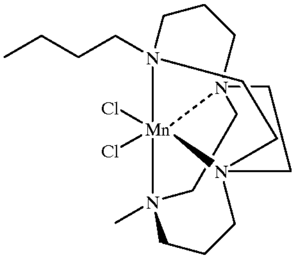

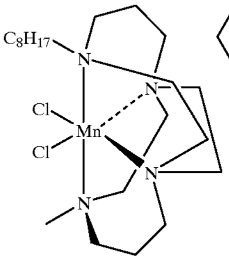

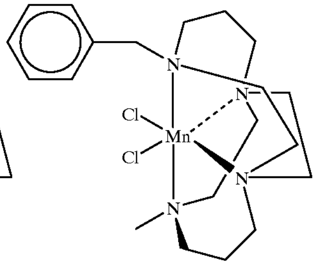

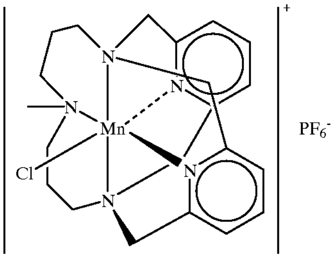

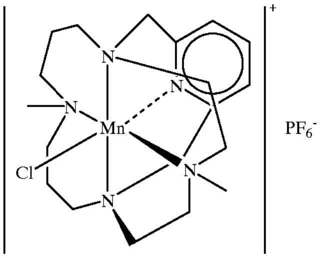

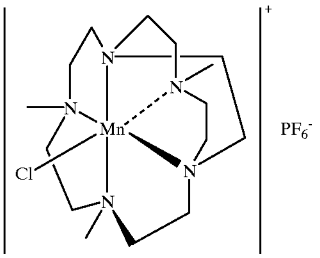

In other embodiments of the invention, transition-metal complexes, such as the Mn, Fe, Co, or Cu complexes, especially (II) and/or (III) oxidation state complexes, of the hereinabove-identified metals with any of the following ligands are also included:

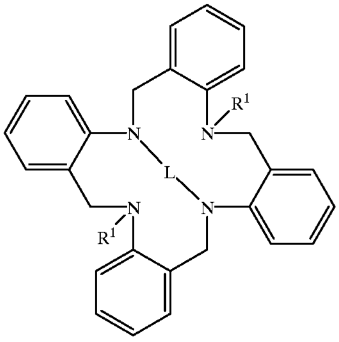

wherein R1 is independently selected from H (preferably non-H) and linear or branched, substituted or unsubstituted C1–C20 alkyl, alkenyl or alkynyl and L is any of the linking moieties given herein, for example 1.10 or 1.11;

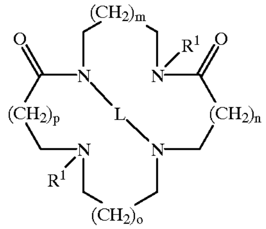

wherein R1 is as defined supra; m, n, o and p can vary independently and are integers which can be zero or a positive integer and can vary independently while respecting the provision that the sum m+n+o+p is from 0 to 8 and L is any of the linking moieties defined herein;

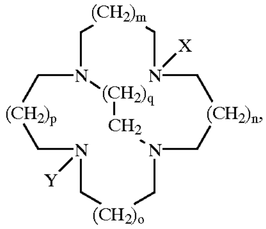

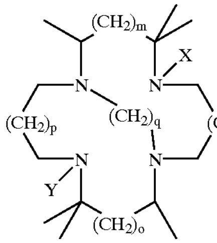

or

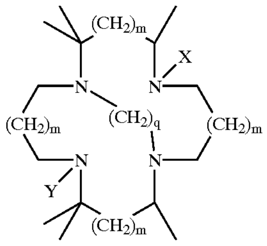

wherein X and Y can be any of the R1 defined supra, m, n, o and p are as defined supra and q is an integer, preferably from 1 to 4; or, more generally,

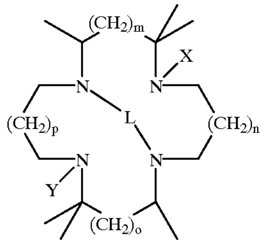

wherein L is any of the linking moieties herein, X and Y can be any of the RI defined supra, and m, n, o and p are as defined supra. Alternately, another useful ligand is:

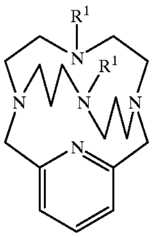

wherein RI is any of the RI moieties defined supra.

Pendant Moieties

Macropolycyclic rigid ligands and the corresponding transition-metal complexes and oxidation catalytic systems herein may also incorporate one or more pendant moieties, in addition to, or as a replacement for, R1 moieties. Such pendant moieties are nonlimitingly illustrated by any of the following:

$-(CH_2)_n-CH_3$ $-(CH_2)_n-C(O)NH_2$ $-(CH_2)_n-CN$ $-(CH_2)_n-C(O)OH$ $-(CH_2)_n-C(O)NR_2$ $-(CH_2)_n-OH$ $-(CH_2)_n-C(O)OR$

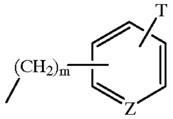

wherein R is, for example, a C1–C12 alkyl, more typically a C1–C4 alkyl, and Z and t are as defined in 1.11. Pendant moieties may be useful, for example, if it is desired to adjust the solubility of the catalyst in a particular solvent adjunct.

Alternatively, complexes of any of the foregoing highly rigid, cross-bridged macropolycyclie ligands with any of the metals indicated are equally within the invention.

Preferred are catalysts wherein the transition metal is selected from manganese and iron, and most preferably manganese. Also preferred are catalysts wherein the molar ratio of transition metal to macropolycyclic ligand in the oxidation catalyst is 1:1, and more preferably wherein the catalyst comprises only one metal per oxidation catalyst complex. Further preferred transition-metal oxidation catalysts are monometallic, mononuclear complexes. The term "monometallic, mononuclear complex" is used herein in referring to an essential transition-metal oxidation catalyst compound to identify and distinguish a preferred class of compounds containing only one metal atom per mole of compound and only one metal atom per mole of cross-bridged macropolycyclic ligand.

Preferred transition-metal oxidation catalysts also include those wherein at least four of the donor atoms in the macropolycyclic rigid ligand, preferably at least four nitrogen donor atoms, two of which form an apical bond angle with the same transition metal of 180±50° and two of which form at least one equatorial bond angle of 90±20°. Such catalysts preferably have four or five nitrogen donor atoms in total and also have coordination geometry selected from distorted octahedral (including trigonal antiprismatic and general tetragonal distortion) and distorted trigonal prismatic, and preferably wherein further the cross-bridged macropolycyclic ligand is in the folded conformation as described, for example, in Hancock and Martell, Chem. Rev., 1989, 89, at page 1894). A folded conformation of a cross-bridged macropolycyclic ligand in a transition-metal complex is further illustrated below:

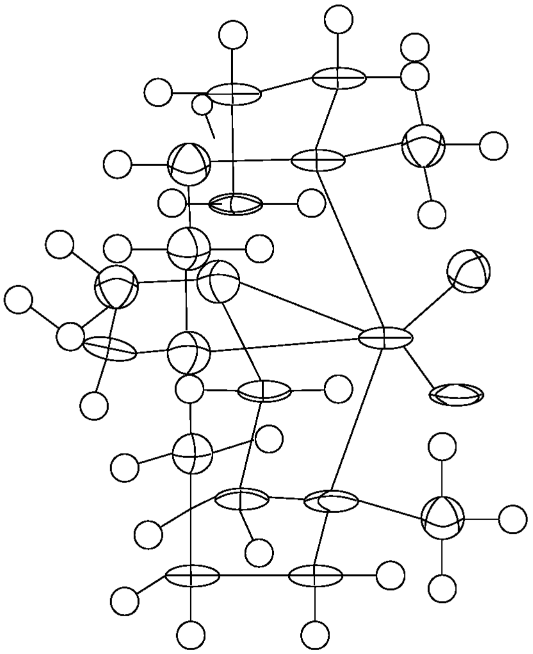

This catalyst is the complex of the Examples hereinafter. The centre atom is Mn; the two ligands to the right are chloride; and a Bcyclam ligand occupies the left side of the distorted octahedral structure. The complex contains an angle N—Mn—N of 158° incorporating the two mutually Trans-donor atoms in "axial" positions; the corresponding angle N—Mn—N for the nitrogen donor atoms in plane with the two chloride ligands is 83.2°.

Stated alternatively, the preferred synthetic, laundry, cleaning, papermaking, or effluent-treating catalytic systems herein contain transition-metal complexes of a macropolycyclic ligand in which there is a major energetic preference of the ligand for a folded, as distinct from an "open" and/or "planar" and or "flat" conformation. for comparison, a disfavored conformation is, for example, either of the trans-structures shown in Hancock and Martell, Chemical Review, (1989), 89 at page 1894 (see FIG. 18), incorporated by reference.

In light of the foregoing coordination description, the present invention includes oxidation catalytic systems comprising a transition-metal oxidation catalyst, especially based on Mn(II) or Mn(III) or correspondingly, Fe(II) or Fe(III) or Cr(II) or Cr(III), wherein two of the donor atoms in the macropolycyclic rigid ligand, preferably two nitrogen donor atoms, occupy mutually trans-positions of the coordination geometry, and at least two of the donor atoms in the macropolycyclic rigid ligand, preferably at least two nitrogen donor atoms, occupy cis-equatorial positions of the coordination geometry including particularly the cases in which there is substantial distortion as illustrated hereinabove.

The present catalytic systems can furthermore, include transition metal oxidation catalysts in which the number of asymmetric sites can vary widely; thus both S- and R-absolute conformations can Me included for any stereochemically active site. Other types of isomerism, such as geometric isomerism, are also included. The transition-metal oxidation catalyst can further include mixtures of geometric or stereoisomers.

The bleaching compositions according to the present invention may be used for laundry cleaning, hard surface cleaning (including cleaning of lavatories, kitchen work surfaces, floors, mechanical ware washing, etc.), as well as other uses where a bleach is needed, for example waste water treatment or pulp bleaching during manufacture of paper, dye transfer inhibition, starch bleaching, sterilisation and/or whitening in oral hygiene preparation, or contact lens disinfection.

In typical washing compositions the level of the organic substance is such that the in-use level is from 1 μM to 50 mM, with preferred in-use levels for domestic laundry operations falling in the range 10 to 100 μM. Higher levels may be desired and applied in industrial bleaching processes, such as textile and paper pulp bleaching.

Preferably, the aqueous medium has a pH in the range from pH 6 to 13, more preferably from pH 6 to 11, still more preferably from pH 8 to 11, and most preferably from pH 8 to 10, in particular from pH 9 to 10.

The bleaching composition of the present invention has particular application in detergent formulations, especially for laundry cleaning. Accordingly, in another preferred embodiment, the present invention provides a detergent bleach composition comprising a bleaching composition as defined above and additionally a surface-active material, optionally together with detergency builder.

The bleach composition according to the present invention may for example contain a surface-active material in an amount of from 10 to 50% by weight. The surface-active material may be naturally derived, such as soap, or a synthetic material selected from anionic, nonionic, amphoteric, zwitterionic, cationic actives and mixtures thereof. Many suitable actives are commercially available and are fully described in the literature, for example in "Surface Active Agents and Detergents", Volumes I and II, by Schwartz, Perry and Berch.

Typical synthetic anionic surface-actives are usually water-soluble alkali metal salts of organic sulphates and sulphonates having alkyl groups containing from about 8 to about 22 carbon atoms, the term "alkyl" being used to include the alkyl portion of higher aryl groups. Examples of suitable synthetic anionic detergent compounds are sodium and ammonium alkyl sulphates, especially those obtained by sulphating higher ($C_8$–$C_{18}$) alcohols produced, for example, from tallow or coconut oil; sodium and ammonium alkyl ($C_9$–$C_{20}$) benzene sulphonates, particularly sodium linear secondary alkyl ($C_{10}$–$C_{15}$) benzene sulphonates; sodium alkyl glyceryl ether sulphates, especially those ethers of the higher alcohols derived from tallow or coconut oil fatty acid monoglyceride sulphates and sulphonates; sodium and ammonium salts of sulphuric acid esters of higher ($C_9$–$C_{18}$) fatty alcohol alkylene oxide, particularly ethylene oxide, reaction products; the reaction products of fatty acids such as coconut fatty acids esterified with isethionic acid and neutralised with sodium hydroxide; sodium and ammonium salts of fatty acid amides of methyl taurine; alkane monosulphonates such as those derived by reacting alpha-olefins ($C_8$–$C_{20}$) with sodium bisulphite and those derived by reacting paraffins with $SO_2$ and $Cl_2$ and then hydrolysing with a base to produce a random sulphonate; sodium and ammonium ($C_7$–$C_{12}$) dialkyl sulphosuccinates; and olefin sulphonates, which term is used to describe material made by reacting olefins, particularly ($C_{10}$–$C_{20}$) alpha-olefins, with $SO_3$ and then neutralising and hydrolysing the reaction product. The preferred anionic detergent compounds are sodium ($C_{10}$–$C_{15}$) alkylbenzene sulphonates, and sodium ($C_{16}$–$C_{18}$) alkyl ether sulphates.

Examples of suitable nonionic surface-active compounds which may be used, preferably together with the anionic surface-active compounds, include, in particular, the reaction products of alkylene oxides, usually ethylene oxide, with alkyl ($C_6$–$C_{22}$) phenols, generally 5–25 EO, i.e. 5–25 units of ethylene oxides per molecule; and the condensation products of aliphatic ($C_8$–$C_{18}$) primary or secondary linear or branched alcohols with ethylene oxide, generally 2–30 EO. Other so-called nonionic surface-actives include alkyl polyglycosides, sugar esters, long-chain tertiary amine oxides, long-chain tertiary phosphine oxides and dialkyl sulphoxides.

Amphoteric or zwitterionic surface-active compounds can also be used in the compositions of the invention but this is not normally desired owing to their relatively high cost. If any amphoteric or zwitterionic detergent compounds are used, it is generally in small amounts in compositions based on the much more commonly used synthetic anionic and nonionic actives.

The detergent bleach composition of the invention will preferably comprise from 1 to 15% wt of anionic surfactant and from 10 to 40% by weight of nonionic surfactant. In a further preferred embodiment, the detergent active system is free from $C_{16}$–$C_{12}$ fatty acid soaps.

The bleach composition of the present invention may also contains a detergency builder, for example in an amount of from about 5 to 80% by weight, preferably from about 10 to 60% by weight.

Builder materials may be selected from 1) calcium sequestrant materials, 2) precipitating materials, 3) calcium ion-exchange materials and 4) mixtures thereof.

Examples of calcium sequestrant builder materials include alkali metal polyphosphates, such as sodium tripolyphosphate; nitrilotriacetic acid and its water-soluble salts; the alkali metal salts of carboxymethyloxy succinic acid, ethylene diamine tetraacetic acid, oxydisuccinic acid, mellitic acid, benzene polycarboxylic acids, citric acid; and polyacetal carboxylates as disclosed in U.S. Pat. No. 4,144,226 and U.S. Pat. No. 4,146,495.

Examples of precipitating builder materials include sodium orthophosphate and sodium carbonate.

Examples of calcium ion-exchange builder materials include the various types of water-insoluble crystalline or amorphous aluminosilicates, of which zeolites are the best known representatives, e.g. zeolite A, zeolite B (also known as zeolite P), zeolite C, zeolite X, zeolite Y and also the zeolite P-type as described in EP-A-0,384,070.

In particular, the compositions of the invention may contain any one of the organic and inorganic builder materials, though, for environmental reasons, phosphate builders are preferably omitted or only used in very small amounts. Typical builders usable in the present invention are, for example, sodium carbonate, calcite/carbonate, the sodium salt of nitrilotriacetic acid, sodium citrate, carboxymethyloxy malonate, carboxymethyloxy succinate and water-insoluble crystalline or amorphous aluminosilicate builder materials, each of which can be used as the main builder, either alone or in admixture with minor amounts of other builders or polymers as co-builder.

It is preferred that the composition contains not more than 5% by weight of a carbonate builder, expressed as sodium carbonate, more preferably not more than 2.5% by weight to substantially nil, if the composition pH lies in the lower alkaline region of up to 10.

Apart from the components already mentioned, the bleach composition of the present invention can contain any of the conventional additives in amounts of which such materials are normally employed in fabric washing detergent compositions. Examples of these additives include buffers such as carbonates, lather boosters, such as alkanolamides, particularly the monoethanol amides derived from palmkernel fatty acids and coconut fatty acids; lather depressants, such as alkyl phosphates and silicones; anti-redeposition agents, such as sodium carboxymethyl cellulose and alkyl or substituted alkyl cellulose ethers; stabilisers, such as phosphonic acid derivatives (i.e. Dequest® types); fabric softening agents; inorganic salts and alkaline buffering agents, such as sodium sulphate and sodium silicate; and, usually in very small amounts, fluorescent agents; perfumes; enzymes, such as proteases, cellulases, lipases, amylases and oxidases; germicides and colourants.

Transition metal sequestrants such as EDTA, and phosphonic acid derivatives such as EDTMP (ethylene diamine tetra(methylene phosphonate)) may also be included, in addition to the organic substance specified, for example to improve the stability sensitive ingredients such as enzymes, fluorescent agents and perfumes, but provided the composition remains bleaching effective. However, the composition according to the present invention containing the organic substance, is preferably substantially, and more preferably completely, devoid of transition metal sequestrants (other than the organic substance).

Whilst the present invention is based on the catalytic bleaching of a substrate by atmospheric oxygen or air, it will be appreciated that small amounts of hydrogen peroxide or peroxy-based or -generating systems may be included in the composition, if desired. Therefore, by "substantially devoid of peroxygen bleach or peroxy-based or -generating bleach systems" is meant that the composition contains from 0 to 50%, preferably from 0 to 10%, more preferably from 0 to 5%, and optimally from 0 to 2% by molar weight on an oxygen basis, of peroxygen bleach or peroxy-based or -generating bleach systems. Preferably, however, the composition will be wholly devoid of peroxygen bleach or peroxy-based or -generating bleach systems.

Thus, at least 10%, preferably at least 50% and optimally at least 90% of any bleaching of the substrate is effected by oxygen sourced from the air.

The invention will now be further illustrated by way of the following non-limiting examples:

EXAMPLES

Compound 1: [Mn(Bcyclam)$Cl_2$] was synthesised according to prior art (WO98/39098).

Example 1

Stain: tomato oil stain. Washed for 30 min at 30° C., rinsed, dried and measured immediately ("t=0" and after 1 day storage ("t=1"). In all cases 10 $\mu$M of metal complex is added to the wash liquor (except for blank). The wash liquor contains either buffer only (10 mM borate pH 8 or 10 mM carbonate pH 10) or the same buffers with 0.6 g/l NaLAS (Albright & Wilson). Bleach values expressed in $\Delta E$ (a higher value means a cleaner cloth) are shown in Table 1 below.

TABLE 1

| | pH 5 + LAS | pH 8 − LAS | PH 8 + LAS | pH 10 − LAS | pH 10 + LAS |
|---|---|---|---|---|---|
| | t = 0<br>t = 1 | t = 0<br>t = 1 | t = 0<br>t = 1 | t = 0<br>t = 1 | t = 0<br>t = 1 |
| Blank | 3 | 2 | 4 | 4 | 5 |
| | 3 | 2 | 4 | 3 | 4 |
| Compound | 9 | 2 | 9 | 6 | 8 |
| 1 | 22 | 7 | 21 | 16 | 21 |

The results presented in Table 1 show that this compound bleaches tomato stains at wide range of conditions (pH 5–10 without and with LAS). Further, the results show that upon storage the cloths become very clean upon storage for 1 day.

Example 2

Stain: tomato oil stain. Washed for 30 min at 30° C., rinsed, dried and measured immediately ("t=0" and after 1 day storage ("t=1"). In all cases 10 $\mu$M of metal complex is added to the wash liquor (except for blank). The wash liquor contains buffer (10 mM borate pH 8 or 10 mM carbonate pH 10) with 0.3 g/l Synperonic A7 (Surphos Chemicals, BV) and 0.3 g/l Synperonic A3 (Ellis and Everard PLC). Bleach values expressed in ΔE are shown in Table 2 below.

TABLE 2

| | pH 8 + EO7/EO3 | | pH 10 + EO7/EO3 | |
|---|---|---|---|---|
| | t = 0 | t = 1 | t = 0 | t = 1 |
| Blank | 3 | 3 | 4 | 4 |
| Compound 1 | 14 | 20 | 14 | 19 |

The results presented in Table 2 show that this compound bleaches tomato stains by air also in the presence of EO3/EO7 non-ionics.

Example 3

Stain: tomato oil stain. Washed for 30 min at 30° C., rinsed, dried and measured immediately ("t=0" and after 1 day storage ("t=1"). In all cases 10 $\mu$M of metal complex is added to the wash liquor (except for blank). The wash liquor contains buffer (10 mM borate pH 8 or 10 mM carbonate pH 10) with 0.6 g/l NaLAS, 0.6 mM SSTP and 0.7 mM $CaCl_2$. Bleach values expressed in ΔE are shown in Table 3 below.

TABLE 3

| | pH 8 | | pH 10 | |
|---|---|---|---|---|
| | t = 0 | t = 1 | t = 0<br>t = 1 | |
| Blank | 3 | 3 | 3 | 3 |
| Compound 1 | 14 | 19 | 17 | 22 |

The results presented in Table 3 show that this compound bleaches tomato stains by air also in the presence of LAS/STP with $CaCl_2$.

The results presented in Table 1–3 show that compound 1 bleaches tomato stains by air under a variety of conditions, that mimic the performance of a wide range of detergent powders (LAS/SSTP and LAS/non-ionic based detergents).

What is claimed is:

1. A method of bleaching a substrate comprising applying to the substrate, in an aqueous medium, an organic substance which forms a complex with a transition metal , the complex catalyzing bleaching of the substrate with atmospheric oxygen without use of aldehydes, the bleaching by the composition in the aqueous medium being at least 50% effected by oxygen sourced from the air and the composition devoid of a peroxygen bleach or a peroxy-based or peroxyl-generating bleach system, wherein the organic substance forms the complex of a transition metal coordinated with a macropolycyclic rigid ligand having at least 3 donor atoms, at least two of which are bridgehead donor atoms.

2. The method according to claim 1, wherein the ligand is a cross-bridged macropolycyclic ligand.

3. The method according to claim 1, wherein the medium has a pH value in the range from pH 6 to 11.

4. The method according to claim 1, wherein the medium is devoid of a transition metal sequestrant.

5. The method according to claim 1, wherein the medium further comprises a surfactant.

6. The method according to claim 1, wherein the medium further comprises a builder.

7. The method according to claim 1, wherein the organic substance comprises a preformed complex of a ligand and a transition metal.

8. The method according to claim 1, wherein the organic substance comprises a free ligand that complexes with a transition metal present in the water.

9. The method according to claim 1, wherein the organic substance comprises a free ligand that complexes with a transition metal present in the substrate.

10. The method according to claim 1, wherein the organic substance comprises a composition of a free ligand or a transition metal-substitutable metal-ligand complex, and a source of transition metal.

11. The method according to claim 1, wherein the macropolycyclic rigid ligand is coordinated by four or five donor atoms to the same transition-metal and comprises:

(i) an organic macrocycle ring containing four or more donor atoms separated from each other by covalent linkages of at least one, two to five of these donor atoms being coordinated to the same transition metal in the complex;

(ii) a linking moiety, preferably a cross-bridging chain, which covalently connects at least 2 non-adjacent donor atoms of the organic macrocycle ring, said covalently connected non-adjacent donor atoms being bridgehead donor atoms which are coordinated to the same transition metal in the complex, and wherein said linking moiety comprises from 2 to about 10 atoms; and (iii) optionally, one or more non-macropolycyclic ligands selected from the group consisting of $H_2O$, ROH, $NR_3$, RCN, $OH^-$, $OOH^-$, $RS^-$, $RO^-$, $RCOO^-$, $OCN^-$, $SCN^-$, $N_3^-$, $CN^-$, $F^-$, $Cl^-$, $Br^-$, $I^-$, $O_2^-$, $NO_3^-$, $NO_2^-$, $SO_4^{2-}$, $SO_3^{2-}$, $PO_4^{3-}$, organic phosphates, organic phosphonates, organic sulphates, organic sultanates, and aromatic N donors, the aromatic N donors being selected from the group consisting of pyridines, pyrazines, pyrazoles, imidazoles, benzimidazoles, pyrimidines, triazoles and thiazoles with R being H, optionally substituted alkyl, or optionally substituted aryl.

12. The method according to claim 11, wherein the donor atoms in the organic macrocycle ring of the macropolycyclic ligand are selected from N, O, S and P.

13. The method according to claim 12, wherein the organic macropolycyclic ligand comprises 4 or 5 donor atoms, all of which are coordinated to the same transition metal.

14. The method according to claim 11, wherein the organic macropolycyclic ligand comprises an organic macrocycte ring containing at least 12 atoms.

15. The method according to claim 1, wherein the macropolycyclic rigid ligand is selected from the group consisting of:

(i) the macropolycyclic rigid ligand of formula (I) having denticity of 3 or 4:

(I)

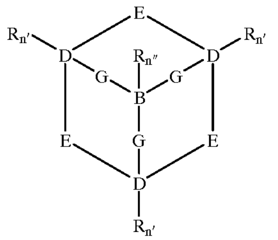

(ii) the macropolycyclic rigid ligand of formula (II) having denticity of 4 or 5

(II)

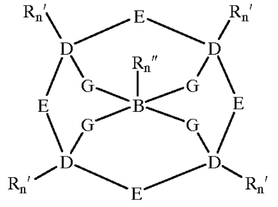

(iii) the macropolycyclic rigid ligand of formula (III) having denticity of 5 or 6:

(III)

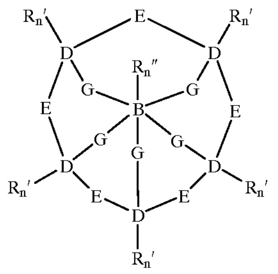

(iv) the macropolycyclic rigid ligand of formula (IV) having denticity of 6 or 7

(IV)

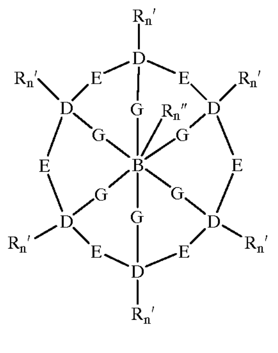

wherein in these formulas:

each "E" is the moiety $(CR_n)_a$—X—$(CR_n)_{a'}$, wherein X is selected from the group consisting of O, S, NR and P, and a covalent bond and for each E the sum of a+a' is independently selected from 1 to 5 wherein:

each "G" is the moiety$(CR_n)_b$;

each "R" is independently selected from H, alkyl, alkenyl, alkynyl, aryl, alkylaryl and heteroaryl, or two or more R are covalently bonded to form an aromatic, heteroaromatic, cycloalkyl, or heterocycloalkyl ring;

each "D" is a donor atom independently selected from the group consisting of N, O, S, and P, and at least two D atoms are bridgehead donor atoms coordinated to the transition metal;

"B" is a carbon atom or "D" donor atom, or a cycloalkyl or heterocyclic ring;

each "n" is an integer independently selected from 1 and 2, completing the valence of the carbon atoms to which the R moieties are covalently bonded;

each "n"' is an integer independently selected from 0 and1, completing the valence of the D donor atoms to which the R moieties are covalently bonded;

each "n"" is an integer independently selected from 0, 1, and 2 completing the valence of the B atoms to which the R moieties are covalently bonded;

each "a" and "a"' is an integer independently selected from 0–5 wherein the sum of all "a" plus "a"' in the ligand of formula (I) is within the range of from 7 to 11, the sum of all "a" plus "a"' in the ligand of formula (II) is within the range of from 8 to 12, the sum of all "a" plus "a"' in the ligand of formula (III) is within the range of from 10 to 15, and the sum of all "a" plus "a"' in the ligand of formula (IV) is within the range of from 12 to 18;

each "b" is an integer independently selected from 0–9, or in any of the above formulas, one or more of the $(CR_n)_b$ moieties covalently bonded from any D to the B atom is absent as long as at least two $(CR_n)_b$ covalently bond two of the D donor atoms to the B atom in the formula, and the sum of all "b" is within the range of from about 1 to about 5.

16. The method according to claim 15, wherein in the macropolycyclic ligand all "a" are independently selected from the integers 2 and 3, all X are selected from covalent bonds, all "a"' are 0, and all "b" are independently selected from 0 or the integers 1 and 2, and D is selected from the group consisting of N and O.

17. The method according to claim 16, wherein the molar ratio of transition metal to macropolycyclic ligand is 1:1, and the transition metal is manganese or iron.

18. The method according to claim 1, wherein the macropolycyclic rigid ligand is a macropolycyclic moiety of formula:

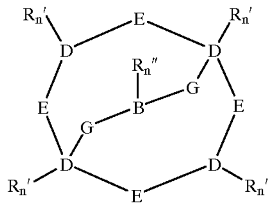

wherein each "a" is independently selected from the integers 2 or 3, and each "b" is independently selected from the integers 0, 1 and 2.

19. The method according to claim 1, wherein the macropolycyclic rigid ligand is a macropolycyclic moiety of formula:

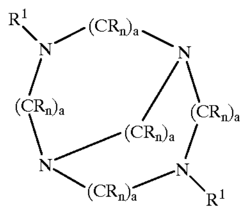

wherein:

each "n" is an integer independently selected from 1 and 2, completing the valence of the carbon atom to which the R moieties are covalently bonded;

each "R" and "R$^1$" is independently selected from H, alkyl, alkenyl, alkynyl, aryl, alkylaryl (e.g., benzyl) and heteroaryl. or R and/or R1 are covalently bonded to form an aromatic, heteroaromatic, cycloalkyl, or heterocycloalkyl ring, and wherein preferably all R are H and R$^1$ are independently selected from linear or branched, substituted or unsubstituted C1–C20 alkyl, alkenyl or alkynyl;

each "a" is an integer independently selected from 2 or 3;

all nitrogen atoms in the cross-bridged macropolycycle rings are coordinated with the transition metal.

20. The method according to claim 1, wherein the macropolycyclic rigid ligand is of the formula 1.2:

1.2

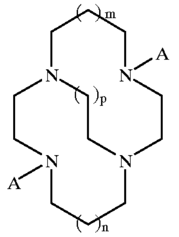

wherein m and n are 0 or integers from 1 to 2, p is an integer from 1 to 6 or m is 0 and n is at least 1; and p is 1;

and A is a nonhydrogen moiety; and each A can vary independentLy.

21. The method according to claim 1, wherein the macropolycyclic ligand is of the formula:

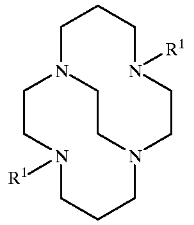

wherein "R$^1$" is independently selected from H, and linear or branched, substituted or unsubstituted C1–C20 alkyl, alkylaryl, alkenyl or alkynyl; and all nitrogen atoms in the macropolycyclic rings are coordinated with the transition metal.

22. The method according to claim 1, wherein the macropolycyclic ligand is of the formula:

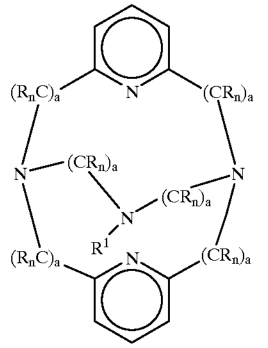

wherein each "n" is an integer independently selected from 1 and 2, completing the valence of the carbon atom to which the R moieties are covalently bonded;

each "R" and "R$^1$" is independently selected from H, alkyl, alkenyl, alkynyl, aryl, alkylaryl, and heteroaryl, or R and/or R$^1$ are covalently bonded to form an aromatic, heteroaromatic, cycloalkyl, or heterocycloalkyl ring,;

each "a" is an integer independently selected from 2 or 3;

all nitrogen atoms in the macropolycyclic rings are coordinated with the transition metal.

23. The method according to claim 1, wherein the macropolycyclic ligand of the formula:

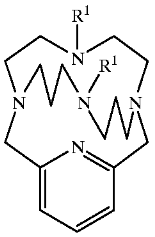

or

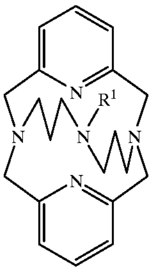

wherein "R$^1$" is independently selected from H and linear or branched, substituted or unsubstituted C1–C20 alkyl, alkenyl or alkynyl; and all nitrogen atoms in the macropolycyclic rings are coordinated with the transition metal.

24. The method according to claim 1, wherein the complex is pre-formed outside the aqueous medium.

* * * * *